US 11,427,049 B2

(12) United States Patent
Shimauchi

(10) Patent No.: US 11,427,049 B2
(45) Date of Patent: Aug. 30, 2022

(54) VEHICLE AIR CONDITIONER

(71) Applicant: Toyota Jidosha Kabushiki Kaisha, Toyota (JP)

(72) Inventor: Takayuki Shimauchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 15 days.

(21) Appl. No.: 17/099,045

(22) Filed: Nov. 16, 2020

(65) Prior Publication Data

US 2021/0237533 A1 Aug. 5, 2021

(30) Foreign Application Priority Data

Jan. 30, 2020 (JP) .............................. JP2020-013331

(51) Int. Cl.
*B60H 1/32* (2006.01)
*B60H 1/00* (2006.01)

(52) U.S. Cl.
CPC ......... *B60H 1/00278* (2013.01); *B60H 1/004* (2013.01); *B60H 1/3205* (2013.01); *B60H 1/3227* (2013.01); *B60H 2001/3241* (2013.01); *B60H 2001/3255* (2013.01)

(58) Field of Classification Search
CPC .. B60H 1/00278; B60H 1/004; B60H 1/3205; B60H 1/3227; B60H 2001/3241; B60H 2001/3255
See application file for complete search history.

(56) References Cited

U.S. PATENT DOCUMENTS 9,851,127 B2 * 12/2017 Takeuchi ........... B60H 1/00278
10,866,019 B2 * 12/2020 Blatchley ............. B60H 1/3213
2017/0267063 A1   9/2017 Shan
2021/0101450 A1 *  4/2021 Kobayashi ............... B60H 1/04
2021/0316597 A1 * 10/2021 Okamura ............... F25B 25/005
2021/0347224 A1 * 11/2021 Sugimura ............. B60K 11/04

FOREIGN PATENT DOCUMENTS

| JP | H08091041 A  | 4/1996  |
| JP | 2005-297802 A | 10/2005 |
| JP | 2017-171284 A | 9/2017  |

* cited by examiner

*Primary Examiner* — Marc E Norman
(74) *Attorney, Agent, or Firm* — Dinsmore & Shohl LLP

(57) ABSTRACT

A vehicle air conditioner includes a heat pump system and an air conditioner ECU that controls the heat pump system. An operation mode of the heat pump system includes an air cooling mode, an air heating mode, a serial dehumidification air-heating mode, a parallel dehumidification air-heating mode, a battery-only cooling mode, and an air-cooling battery-cooling mode. The air conditioner ECU separately sets conditions for permitting cooling of a battery, depending on the operation mode.

12 Claims, 12 Drawing Sheets

FIG. 5 SERIAL DEHUMIDIFICATION AIR-HEATING MODE

PARALLEL DEHUMIDIFICATION
AIR-HEATING MODE

BATTERY-ONLY COOLING MODE

AIR-COOLING
BATTERY-COOLING MODE

VEHICLE AIR CONDITIONER

CROSS-REFERENCE TO RELATED APPLICATION

This application claims priority to Japanese Patent Application No. 2020-013331 filed on Jan. 30, 2020, incorporated herein by reference in its entirety.

BACKGROUND

1. Technical Field

The disclosure relates to a vehicle air conditioner.

2. Description of Related Art

Conventionally, a vehicle heat pump system that can switch between a cooling mode and a heating mode is known (see Japanese Unexamined Patent Application Publication No. 2017-171284 (JP 2017-171284 A), for example).

The heat pump system in JP 2017-171284 A is configured to cool and heat an occupant cabin, and to cool a battery. The heat pump system includes an outside heat exchanger, an inside heat exchanger, a compressor, an intermediate heat exchanger and a battery cooler. In the cooling mode, a refrigerant that is circulated by the compressor is condensed in the outside heat exchanger, and is vaporized in the inside heat exchanger and the battery cooler. Then, using the vaporization heat of the refrigerant, the occupant cabin and the battery are cooled. In the cooling mode, the occupant cabin and the battery can be cooled concurrently, and can be cooled selectively. In the heating mode, the refrigerant that is circulated by the compressor is condensed in the intermediate heat exchanger, and is vaporized in the outside heat exchanger. Then, using the condensation heat of the refrigerant, the occupant cabin is warmed.

SUMMARY

In the above conventional heat pump system, it is not possible to warm the occupant cabin while cooling the battery. Therefore, there is room for improvement in increasing air conditioning comfort in the occupant cabin while restraining deterioration in the battery. For example, when the condition for permitting the cooling of the battery is the same regardless of the operation mode of the heat pump system, the battery can deteriorate and the air conditioning comfort in the occupant cabin can decrease.

The disclosure has been made for solving the above problem, and an object of the disclosure is to provide a vehicle air conditioner that makes it possible to increase the air conditioning comfort in the vehicle cabin while restraining the deterioration in the battery.

A vehicle air conditioner according to the disclosure includes a heat pump system that is equipped in a vehicle, and a control device that controls the heat pump system. An operation mode of the heat pump system includes an air cooling mode, an air heating mode and a battery cooling mode. The heat pump system includes an outside heat exchanger, an inside heat exchanger, a compressor, an air-heating heat exchanger and a battery heat exchanger, the heat pump system being configured to cool a vehicle cabin using a vaporization heat of a refrigerant that is circulated by the compressor, in the air cooling mode, the vaporization heat being generated in the inside heat exchanger, the heat pump system being configured to heat the vehicle cabin using a condensation heat of the refrigerant that is circulated by the compressor, in the air heating mode, the condensation heat being generated in the air-heating heat exchanger, the heat pump system being configured to cool a battery using a vaporization heat of the refrigerant that is circulated by the compressor, in the battery cooling mode, the vaporization heat being generated in the battery heat exchanger. The control device is configured to separately set a condition for permitting switching from the air cooling mode to the battery cooling mode and a condition for permitting switching from the air heating mode to the battery cooling mode.

With this configuration, the switching to the battery cooling mode is permitted at an appropriate timing depending on the air cooling mode, and the switching to the battery cooling mode is permitted at an appropriate timing depending on the air heating mode. Thereby, it is possible to increase air conditioning comfort in a vehicle cabin while restraining deterioration in the battery.

In the above vehicle air conditioner, the control device may be configured to determine whether to permit the switching from the air heating mode to the battery cooling mode, based on a battery cooling request level that is decided depending on the temperature of the battery.

In this case, the control device may be configured to permit the switching from the air heating mode to the battery cooling mode, when the battery cooling request level is a level at which it is necessary to immediately cool the battery, in the air heating mode.

In the above vehicle air conditioner, the control device may be configured to determine whether to permit the switching from the air cooling mode to the battery cooling mode, based on at least one of an open-closed state of a defroster blowing port, an air cooling load, an air cooling preference time from a vehicle start-up, the temperature of air in the vehicle cabin, the temperature of the inside heat exchanger, and a dehumidification capacity.

In the above vehicle air conditioner that determines the switching from the air cooling mode to the battery cooling mode, the control device may be configured to permit the switching from the air cooling mode to the battery cooling mode, when the defroster blowing port is in an open state and the dehumidification capacity is not insufficient in the air cooling mode.

In the above vehicle air conditioner that determines the switching from the air cooling mode to the battery cooling mode, the control device may be configured to permit the switching from the air cooling mode to the battery cooling mode, when the defroster blowing port is in a closed state, the air cooling load is low and the dehumidification capacity is not insufficient in the air cooling mode.

In the above vehicle air conditioner that determines the switching from the air cooling mode to the battery cooling mode, the control device may be configured to permit the switching from the air cooling mode to the battery cooling mode, when the defroster blowing port is in a closed state, the air cooling load is high and the air cooling preference time has elapsed in the air cooling mode.

In the above vehicle air conditioner that determines the switching from the air cooling mode to the battery cooling mode, the control device may be configured to permit the switching from the air cooling mode to the battery cooling mode, when the defroster blowing port is in a closed state, the air cooling load is high, the air cooling preference time has not elapsed and the temperature of the air in the vehicle cabin is low in the air cooling mode.

In the above vehicle air conditioner that determines the switching from the air cooling mode to the battery cooling mode, the control device may be configured to permit the switching from the air cooling mode to the battery cooling mode, when the defroster blowing port is in a closed state, the air cooling load is high, the air cooling preference time has not elapsed, the temperature of the air in the vehicle cabin is high and the temperature of the inside heat exchanger is low in the air cooling mode.

In the above vehicle air conditioner that determines the switching from the air cooling mode to the battery cooling mode, the air cooling preference time may be set to a short time when a battery cooling request level that is decided depending on the temperature of the battery is high, and is set to a shorter time when the vehicle is traveling than when the vehicle is at a standstill.

In the above vehicle air conditioner that determines the switching from the air cooling mode to the battery cooling mode, the control device may be configured to determine that the dehumidification capacity is not insufficient and the air cooling preference time has elapsed, when a battery cooling request level that is decided depending on the temperature of the battery is a level at which it is necessary to immediately cool the battery.

In the above vehicle air conditioner, the heat pump system may include a coolant circuit in which a coolant is circulated, a heater core and the air-heating heat exchanger may be provided in the coolant circuit, and the heat pump system may be configured such that the coolant is warmed in the air-heating heat exchanger and the vehicle cabin is heated by the heater core in the air heating mode.

With the vehicle air conditioner in the disclosure, it is possible to increase the air conditioning comfort in the vehicle cabin while restraining the deterioration in the battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described.

Figure 1:
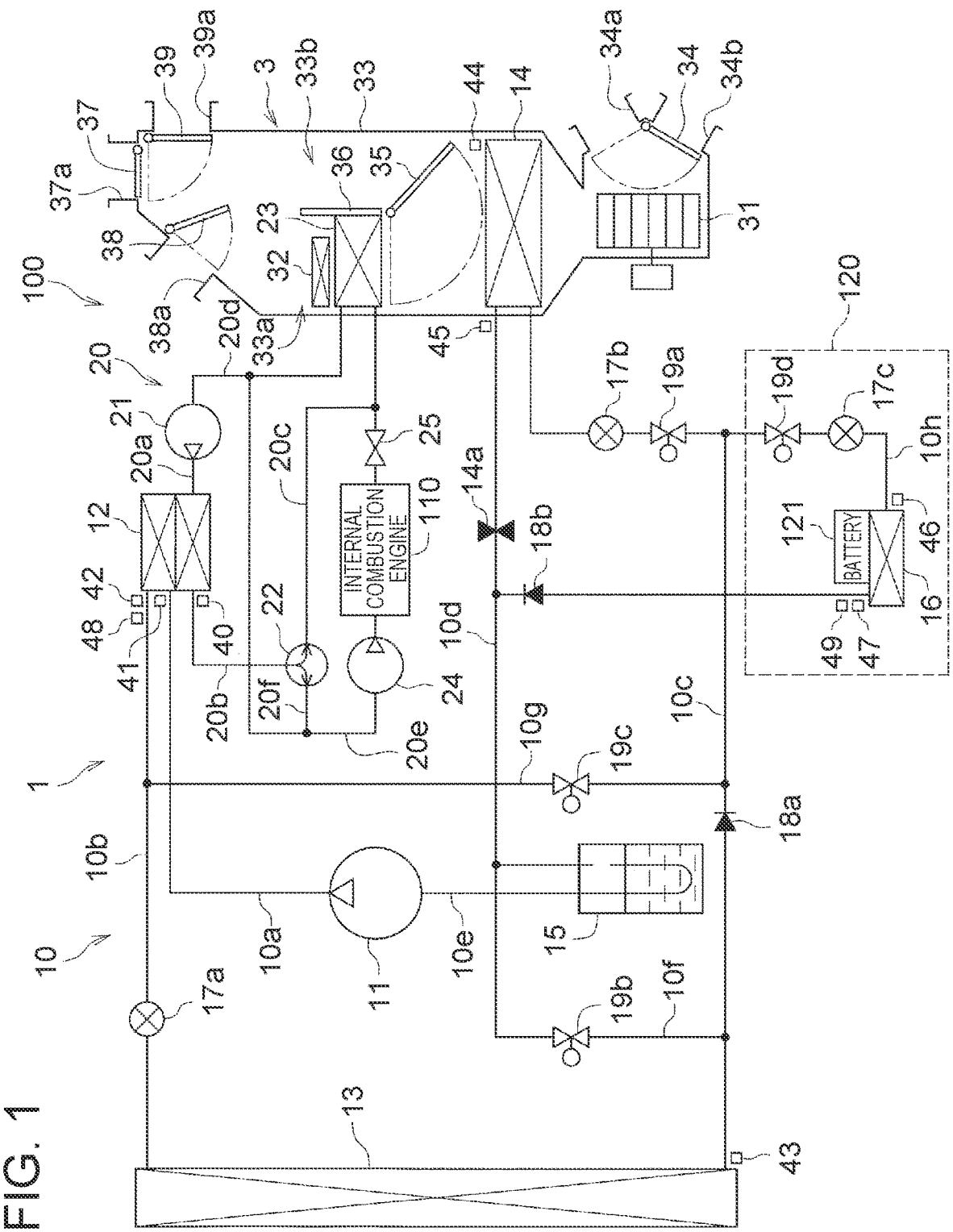
FIG. 1 is a diagram showing a configuration of a heat pump system of a vehicle air conditioner according to an embodiment.

First, a configuration of a vehicle air conditioner 100 according to an embodiment of the disclosure will be described with reference to FIG. 1 and FIG. 2.

For example, the vehicle air conditioner 100 is applied to a plug-in hybrid vehicle that includes an internal combustion engine 110 and an electric motor (not illustrated) as a drive force source for vehicle travel. The plug-in hybrid vehicle is equipped with a battery pack 120, and the battery pack 120 contains a battery 121. The battery 121 is a high-tension battery that can be charged and discharged. The battery 121 is configured to supply electric power for driving the electric motor for vehicle travel, and to store electric power that is generated by the electric motor. As shown in FIG. 1, the vehicle air conditioner 100 includes a heat pump system 1, an air conditioner ECU 2 (see FIG. 2), and an inside air conditioning unit 3.

Heat Pump System

The heat pump system 1 is configured to cool and heat a vehicle cabin and to cool the battery 121. The operation mode of the heat pump system 1 includes an air cooling mode, an air heating mode, a serial dehumidification air-heating mode, a parallel dehumidification air-heating mode, a battery-only cooling mode, an air-cooling battery-cooling mode, and the like. Details of the operation modes will be described in detail. The heat pump system 1 includes a refrigerant circuit 10 in which a refrigerant as a heat medium is circulated, and a coolant circuit 20 in which a coolant as a heat medium is circulated.

Refrigerant Circuit

The refrigerant circuit 10 is provided with refrigerant passages 10a to 10h, a compressor 11, an intermediate heat exchanger 12, an outside heat exchanger 13, an inside heat exchanger 14, an accumulator 15, a battery heat exchanger 16, and expansion valves 17a to 17c. The refrigerant of the refrigerant circuit 10 contains a refrigerating machine oil for lubricating the compressor 11.

The compressor 11 is configured to circulate the refrigerant in the refrigerant circuit 10, by discharging the refrigerant in a gas state at high temperature and pressure. The compressor 11 is driven by an electric-powered motor (not illustrated), and the electric-powered motor can adjust the rotation speed. A discharge port of the compressor 11 is connected to a refrigerant inlet of the intermediate heat exchanger 12 by the refrigerant passage 10a.

The intermediate heat exchanger 12 functions as a condenser in the air heating mode and the like, and is provided for warming the coolant of the coolant circuit 20. The intermediate heat exchanger 12 includes a refrigerant flowing part and a coolant flowing part, and is configured to perform heat exchange between the refrigerant that flows through the refrigerant flowing part and the coolant that flows through the coolant flowing part. The intermediate heat exchanger 12 is an example of the "air-heating heat exchanger" in the disclosure. A refrigerant outlet of the intermediate heat exchanger 12 is connected to a refrigerant inlet of the outside heat exchanger 13 by the refrigerant passage 10b. The refrigerant passage 10b is provided with the expansion valve 17a.

For example, the expansion valve 17a is an electronic valve that allows the opening degree to be adjusted by an electric actuator (not illustrated). In the air heating mode and the like, the opening degree is reduced, so that the passing refrigerant is decompressed and expanded. In the air cooling mode and the like, the expansion valve 17a is fully opened, so that the decompression function is not exerted.

The outside heat exchanger 13 is disposed in an engine compartment, and is configured to perform heat exchange between the refrigerant that passes through the interior of the engine compartment and external air. For example, the outside heat exchanger 13 functions as a condenser in the air cooling mode, and functions as an evaporator in the air heating mode. A refrigerant outlet of the outside heat exchanger 13 is connected to a refrigerant inlet of the inside heat exchanger 14 by the refrigerant passage 10c. The refrigerant passage 10c is provided with a check valve 18a, a solenoid valve 19a and the expansion valve 17b, in the order from the upstream side in the flowing direction of the refrigerant.

The check valve 18a is provided for preventing the reverse flow (a flow to the side of the outside heat exchanger 13) of the refrigerant. The solenoid valve 19a is configured to open and close the refrigerant passage 10c, and is provided for switching a circulation route of the refrigerant. For example, the expansion valve 17b is an electronic valve that allows the opening degree to be adjusted by an electric actuator (not illustrated). In the air cooling mode and the like, the opening degree is reduced, so that the passing refrigerant is decompressed and expanded.

The inside heat exchanger 14 is disposed in a casing 33 of the inside air conditioning unit 3, and is provided for cooling and dehumidifying blowing air in the casing 33. The inside heat exchanger 14 is configured to function as an evaporator in the air cooling mode and the like, and perform heat exchange between the refrigerant that passes through the interior of the inside heat exchanger 14 and the blowing air. A refrigerant outlet of the inside heat exchanger 14 is connected to a refrigerant inlet of the accumulator 15 by the refrigerant passage 10d. The refrigerant passage 10d is provided with a vaporization pressure adjustment valve 14a. The vaporization pressure adjustment valve 14a is provided for adjusting the vaporization pressure of the refrigerant in the inside heat exchanger 14.

The accumulator 15 is provided for separating the refrigerant into gas and liquid. A refrigerant outlet of the accumulator 15 is connected to a suction port of the compressor 11 by the refrigerant passage 10e. Therefore, the compressor 11 sucks only the refrigerant in the gas state.

The refrigerant passage 10f is provided so as to circumvent the inside heat exchanger 14. One end part (an end part on the upstream side) of the refrigerant passage 10f is connected to the refrigerant passage 10c between the refrigerant outlet of the outside heat exchanger 13 and the check valve 18a, and the other end part (an end part on the downstream side) of the refrigerant passage 10f is connected to the refrigerant passage 10d between the vaporization pressure adjustment valve 14a and the refrigerant inlet of the accumulator 15. The refrigerant passage 10f is provided with a solenoid valve 19b. The solenoid valve 19b is configured to open and close the refrigerant passage 10f, and is provided for switching the circulation route of the refrigerant.

The refrigerant passage 10g is provided so as to circumvent the outside heat exchanger 13. One end part (an end part on the upstream side) of the refrigerant passage 10g is connected to the refrigerant passage 10b between the refrigerant outlet of the intermediate heat exchanger 12 and the expansion valve 17a, and the other end part (an end part on the downstream side) of the refrigerant passage 10g is connected to the refrigerant passage 10c between the check valve 18a and the solenoid valve 19a. The refrigerant passage 10g is provided with a solenoid valve 19c. The solenoid valve 19c is configured to open and close the refrigerant passage 10g, and is provided for switching the circulation route of the refrigerant.

The refrigerant passage 10h is provided so as to circumvent the inside heat exchanger 14. One end part (an end part on the upstream side) of the refrigerant passage 10h is connected to the refrigerant passage 10c between the check valve 18a and the solenoid valve 19a, and the other end part (an end part on the downstream side) of the refrigerant passage 10h is connected to the refrigerant passage 10d between the vaporization pressure adjustment valve 14a and the refrigerant inlet of the accumulator 15. The refrigerant passage 10h is provided with a solenoid valve 19d, the expansion valve 17c, the battery heat exchanger 16 and a check valve 18b, in the order from the upstream side in the flowing direction of the refrigerant.

The solenoid valve 19d is configured to open and close the refrigerant passage 10h, and is provided for switching the circulation route of the refrigerant. For example, the expansion valve 17c is an electronic valve that allows the opening degree to be adjusted by an electric actuator (not illustrated). In the battery-only cooling mode and the air-cooling battery-cooling mode, the opening degree is reduced, so that the passing refrigerant is decompressed and expanded. The check valve 18b is provided for preventing the reverse flow (a flow to the side of the battery heat exchanger 16) of the refrigerant.

The battery heat exchanger 16 is disposed in the battery pack 120, and is provided for cooling the battery 121 contained in the battery pack 120. Within the battery heat exchanger 16, a refrigerant flowing part through which the refrigerant flows is provided. A refrigerant inlet of the battery heat exchanger 16 is connected to the expansion valve 17c, and a refrigerant outlet of the battery heat exchanger 16 is connected to the check valve 18b. The battery heat exchanger 16 is configured to function as an evaporator in the battery-only cooling mode and the air-cooling battery-cooling mode, and cool the battery 121 using the vaporization heat. For example, the battery 121 is placed on the battery heat exchanger 16, and the battery 121 is directly cooled by the battery heat exchanger 16.

The refrigerant circuit 10 is provided with temperature sensors 41 to 47 and pressure sensors 48, 49. The temperature sensor 41 is provided for detecting the temperature of the refrigerant discharged from the compressor 11. The temperature sensor 42 and the pressure sensor 48 are provided for detecting the temperature and pressure of the refrigerant having passed through the intermediate heat exchanger 12, respectively. The temperature sensor 43 is provided for detecting the temperature of the refrigerant having passed through the outside heat exchanger 13, and the temperature sensor 45 is provided for detecting the temperature of the refrigerant having passed through the inside heat exchanger 14. The temperature sensor 44 is provided for detecting the temperature (the temperature of a vaporizer) of the inside heat exchanger 14. The temperature sensors 46, 47 are provided for detecting the temperature of the refrigerant before and after the refrigerant passes through the battery heat exchanger 16, and the pressure sensor 49 is provided for detecting the pressure of the refrigerant having passed through the battery heat exchanger 16.

Coolant Circuit

The coolant circuit 20 is provided with coolant passages 20a to 20d, a water pump 21, an intermediate heat exchanger 12, a three-way valve 22 and a heater core 23.

The water pump 21 is configured to circulate the coolant in the coolant circuit 20 during the stop of the internal combustion engine 110. The water pump 21 is driven by an electric-powered motor (not illustrated), and the electric-powered motor can adjust the rotation speed. A discharge port of the water pump 21 is connected to a coolant inlet of the intermediate heat exchanger 12 by the coolant passage 20a.

A coolant outlet of the intermediate heat exchanger 12 is connected to a coolant inlet of the three-way valve 22 by the coolant passage 20b. The coolant passage 20b is provided with a temperature sensor 40 that detects the temperature of the coolant having passed through the intermediate heat exchanger 12.

The three-way valve 22 is provided for switching a circulation route of the coolant. One of the coolant outlets of the three-way valve 22 is connected to a coolant inlet of the heater core 23 by the coolant passage 20c.

The heater core 23 is disposed in the casing 33 of the inside air conditioning unit 3, and is provided for heating the blowing air in the casing 33. The heater core 23 is configured to perform heat exchange between the coolant that passes through the interior of the heater core 23 and the blowing air in the air heating mode and the like. A coolant outlet of the heater core 23 is connected to a suction port of the water pump 21 by the coolant passage 20d.

The coolant circuit 20 is provided with a coolant passage 20e. The coolant passage 20e is provided with a water pump 24, a water jacket of the internal combustion engine 110, and a changeover valve 25, in the order from the upstream side in the flowing direction of the coolant. One end part (an end part on the upstream side) of the coolant passage 20e is connected to the coolant passage 20d, and the other end part (an end part on the downstream side) of the coolant passage 20e is connected to the coolant passage 20c. The coolant passage 20e on the upstream side of the water pump 24 is connected to the other of the coolant outlets of the three-way valve 22 by the coolant passage 20f.

The water pump 24 is configured to circulate the coolant water in the coolant circuit 20 during the operation of the internal combustion engine 110. The water jacket is a coolant flowing part formed in the internal combustion engine 110, and is provided for drawing heat from the internal combustion engine 110 using the flowing coolant. That is, the coolant flowing through the water jacket is warmed by the internal combustion engine 110. The changeover valve 25 is a flow shutting valve (FSV), and is provided for opening and closing the coolant passage 20e.

The coolant circuit 20 is provided with a radiator (not illustrated) for radiating the heat of the coolant to the exterior, and the like, but the description is omitted for simplification.

In the coolant circuit 20, during the operation of the internal combustion engine 110, the changeover valve 25 is opened, and the coolant inlet of the three-way valve 22 is connected to the other of the coolant outlets of the three-way valve 22. Then, by the drive of the water pump 24, the coolant discharged from the water pump 24 is warmed when passing through the water jacket, and the warmed coolant flows into the heater core 23. The coolant having flowed out of the heater core 23 is sucked into the water pump 24 through the intermediate heat exchanger 12 and the three-way valve 22, and is sucked into the water pump 24 while circumventing the intermediate heat exchanger 12 and the three-way valve 22.

During the stop of the internal combustion engine 110, the changeover valve 25 is closed, and the coolant inlet of the three-way valve 22 is connected to the one of the coolant outlets of the three-way valve 22. Therefore, in the coolant circuit 20, a circulation route of the coolant on which the internal combustion engine 110 is not included is formed. For example, in the air heating mode, by the drive of the water pump 21, the coolant discharged from the water pump 21 is warmed when passing through the intermediate heat exchanger 12. Then, the warmed coolant flows into the heater core 23 through the three-way valve 22, and the coolant having flowed out of the heater core 23 is sucked into the water pump 21.

Inside Air Conditioning Unit

The inside air conditioning unit 3 is provided for blowing, into the vehicle cabin, an air conditioner wind having a temperature adjusted by the heat pump system 1. The inside air conditioning unit 3 includes a blower 31, the inside heat exchanger 14, the heater core 23, a PTC heater 32, and the casing 33 that contains the blower 31, the inside heat exchanger 14, the heater core 23 and the PTC heater 32.

The casing 33 constitutes a passage of the blowing air that is generated by the blower 31. On the casing 33, an external air introduction port 34a and an internal air introduction port 34b are formed at an upstream end part in the flowing direction of the blowing air. The external air introduction port 34a is provided for introducing external air (air in the exterior of the vehicle cabin) to the interior of the casing 33, and the internal air introduction port 34b is provided for introducing internal air (air in the interior of the vehicle cabin) to the interior of the casing 33. An internal air-external air switching door 34 and the blower 31 are provided near the external air introduction port 34a and the internal air introduction port 34b. The internal air-external air switching door 34 is configured to adjust the ratio between the internal air and external air that are introduced into the casing 33, by adjusting the opening area of the external air introduction port 34a and the opening area of the internal air introduction port 34b. The blower 31 is driven by an electric-powered motor (not illustrated), and the electric-powered motor can adjust the rotation speed.

The inside heat exchanger 14 is disposed on the downstream side of the blower 31 in the flowing direction of the blowing air. An air-mix door 35 and a partition wall 36 are provided on the downstream side of the inside heat exchanger 14 in the casing 33. The partition wall 36 forms a heating passage 33a and a bypass passage 33b in the casing 33.

On the heating passage 33a, the heater core 23 and the PTC heater 32 are disposed. Therefore, the blowing air passing through the heating passage 33a is heated in the case where the temperature of the coolant of the heater core 23 is higher than the temperature of the blowing air, and is heated in the case where the PTC heater 32 is operating. The bypass passage 33b is provided such that the blowing air can circumvent the heater core 23 and the PTC heater 32. The air-mix door 35 is configured to adjust the temperature of the air conditioner wind that is supplied into the vehicle cabin, by adjusting the ratio between the volume of the air passing through the heating passage 33a and the volume of the air passing through the bypass passage 33b.

The PTC heater 32 is disposed on the downstream side of the heater core 23 in the flowing direction of the blowing air, and is provided for assisting the heating of the blowing air by the heater core 23. The PTC heater 32 includes a plurality of PTC elements, and each of the PTC elements is a heating element that generates heat by being energized. Therefore, the PTC heater 32 can adjust heating capacity by adjusting the number of PTC elements that are energized.

In the casing 33, blowing ports 37a to 39a are formed at a downstream end part in the flowing direction of the blowing air. The blowing port 37a is a face blowing port for blowing the air conditioner wind to the upper half of the body of an occupant in the vehicle cabin, the blowing port 38a is a foot blowing port for blowing the air conditioner wind to the feet of the occupant in the vehicle cabin, and the blowing port 39a is a defroster blowing port for blowing the air conditioner wind to the inner surface of a windshield (not illustrated). The blowing ports 37a to 39a are provided with doors 37 to 39 for adjusting the opening areas, respectively. The door 37 is a face door that opens and closes the blowing port 37a, the door 38 is a foot door that opens and closes the blowing port 38a, and the door 39 is a defroster door that opens and closes the blowing port 39a.

As a blowing port mode, for example, a face mode, a bi-level mode, a foot mode, a defroster mode or a foot-defroster mode is set. In the face mode, the air conditioner wind is blown from the blowing port 37a. In the bi-level mode, the air conditioner wind is blown from the blowing ports 37a, 38a. In the foot mode, the air conditioner wind is blown from the blowing port 38a. In the defroster mode, the air conditioner wind is blown from the blowing port 39a. In the foot-defroster mode, the air conditioner wind is blown from the blowing ports 38a, 39a.

Air Conditioner ECU

The air conditioner ECU 2 is a microcomputer that includes a CPU, a ROM, a RAM and the like, and is configured to control the heat pump system 1 and the inside air conditioning unit 3. The air conditioner ECU 2 is an example of the "control device" in the disclosure.

Figure 2:
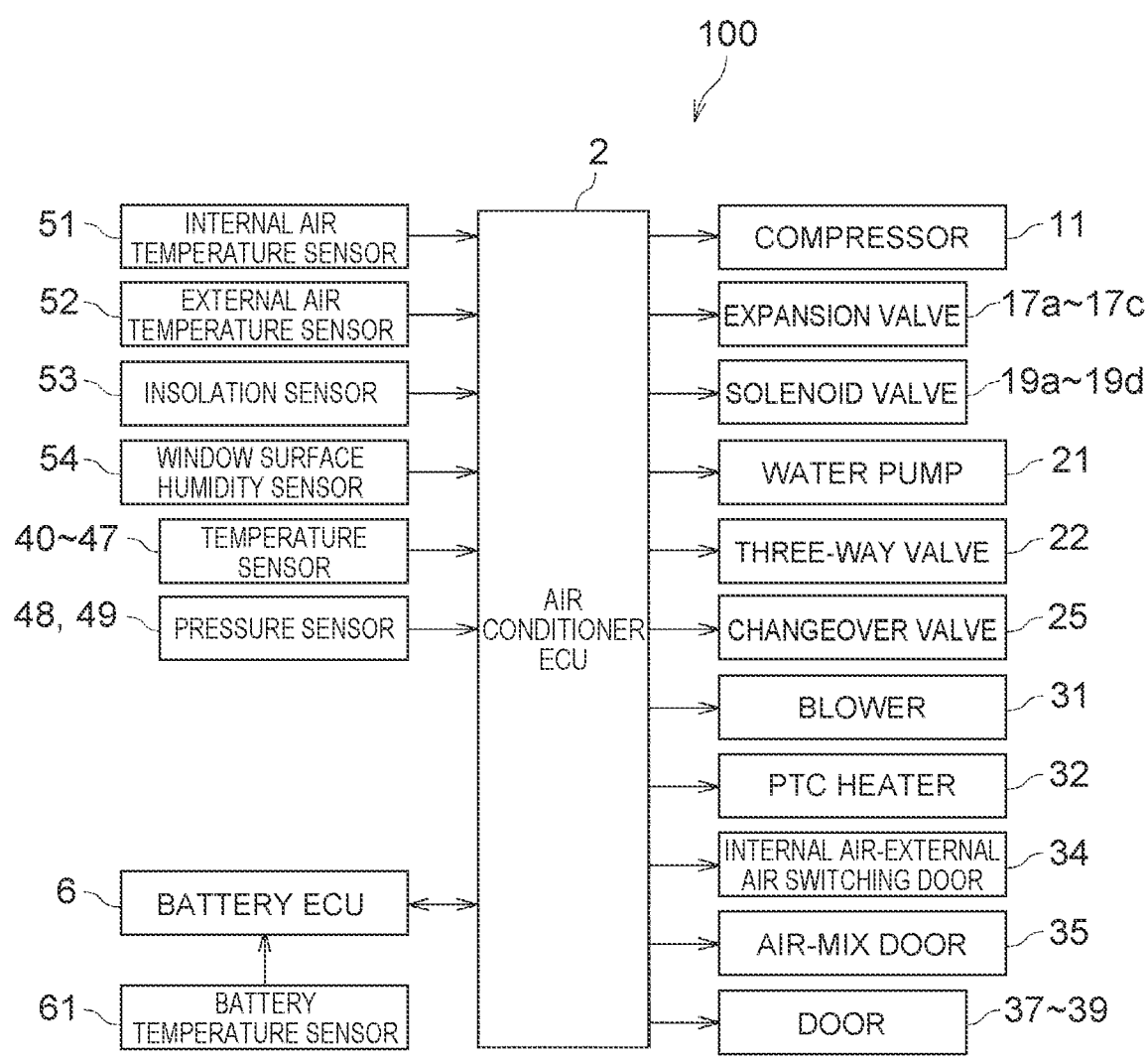
FIG. 2 is a block diagram showing an air conditioner ECU of the vehicle air conditioner according to the embodiment.

As shown in FIG. 2, the air conditioner ECU 2 is connected to the temperature sensors 40 to 47, the pressure sensors 48, 49, an internal air temperature sensor 51, an external air temperature sensor 52, an insolation sensor 53 and a window surface humidity sensor 54, and receives detection results of the sensors. The internal air temperature sensor 51 is provided for detecting the temperature (internal air temperature) of the air in the interior of the vehicle cabin, and the external air temperature sensor 52 is provided for detecting the temperature (external air temperature) of the air in the exterior of the vehicle cabin. The insolation sensor 53 is provided for detecting the amount of insolation in the vehicle cabin. The window surface humidity sensor 54 is provided for calculating the relative humidity of the air near the windshield in the vehicle cabin.

Further, the air conditioner ECU 2 is connected to a battery ECU 6. The battery ECU 6 is a microcomputer including a CPU, a ROM, a RAM and the like, and is configured to manage the battery 121.

The air conditioner ECU 2 is configured to control the heat pump system 1 and the inside air conditioning unit 3, based on inputs from the sensors and the battery ECU 6, and the like.

For example, for the inside air conditioning unit 3, the air conditioner ECU 2 adjusts the ratio between the internal air and external air that are introduced into the casing 33, by controlling the internal air-external air switching door 34. The air conditioner ECU 2 adjusts the blowing air volume of the blower 31, and controls the PTC heater 32. The air conditioner ECU 2 adjusts the volume of the air that passes through the heating passage 33a, by controlling the air-mix door 35. The air conditioner ECU 2 controls the doors 37 to 39 to open and close the blowing ports 37a to 39a, depending on the blowing port mode.

The air conditioner ECU 2 is configured to actuate the heat pump system 1 depending on the operation mode, by controlling parts of the heat pump system 1.

Operation Mode of Heat Pump System

Next, the operation mode of the heat pump system 1 will be described with reference to FIG. 3 to FIG. 8. A case where the internal combustion engine 110 is in a stop state and the PTC heater 32 is in a non-actuation state (non-energization state) will be described below. The description will be made in the order of the air cooling mode, the air heating mode, the serial dehumidification air-heating mode, the parallel dehumidification air-heating mode, the battery-only cooling mode and the air-cooling battery-cooling mode.

Air Cooling Mode

Figure 3:
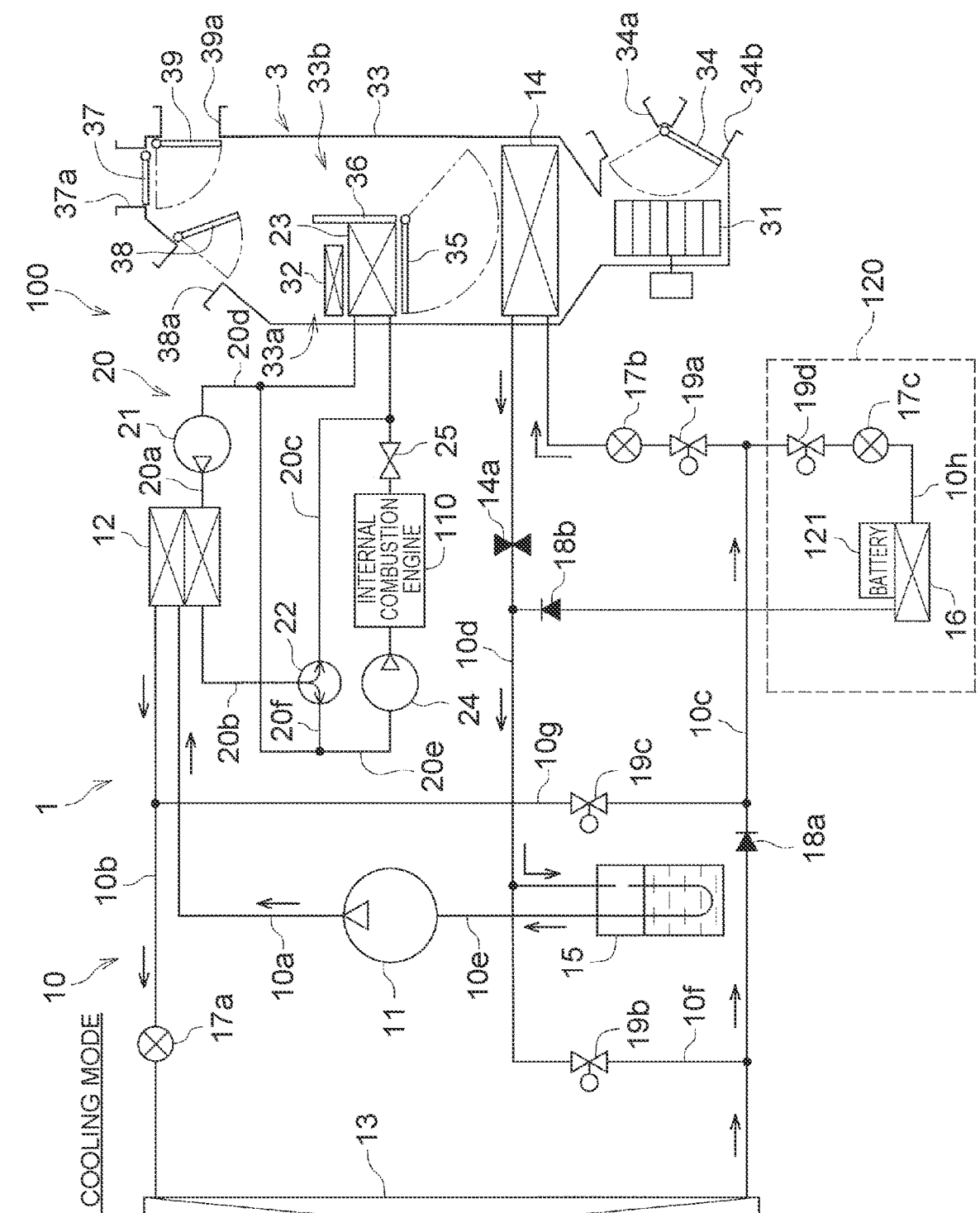
FIG. 3 is a diagram for describing a flow of a refrigerant in an air cooling mode of the heat pump system in FIG. 1.

The air cooling mode is a mode for cooling the vehicle cabin by cooling the blowing air. As shown in FIG. 3, in the air cooling mode, by the air conditioner ECU 2 (see FIG. 2), the solenoid valve 19a is opened, the solenoid valves 19b to 19d are closed, the expansion valve 17a is fully opened, the compressor 11 is driven, and the expansion valve 17b is controlled in a throttling state. The expansion valve 17c may be closed, or may be opened.

Thereby, the refrigerant discharged from the compressor 11 flows through the intermediate heat exchanger 12, the outside heat exchanger 13, the solenoid valve 19a, the expansion valve 17b, the inside heat exchanger 14 and the accumulator 15 in this order, and returns to the compressor 11. At this time, the outside heat exchanger 13 functions as a condenser, and the inside heat exchanger 14 functions as an evaporator. Therefore, the blowing air passing through the inside heat exchanger 14 is cooled by the vaporization heat of the refrigerant in the inside heat exchanger 14.

Air Heating Mode

Figure 4:
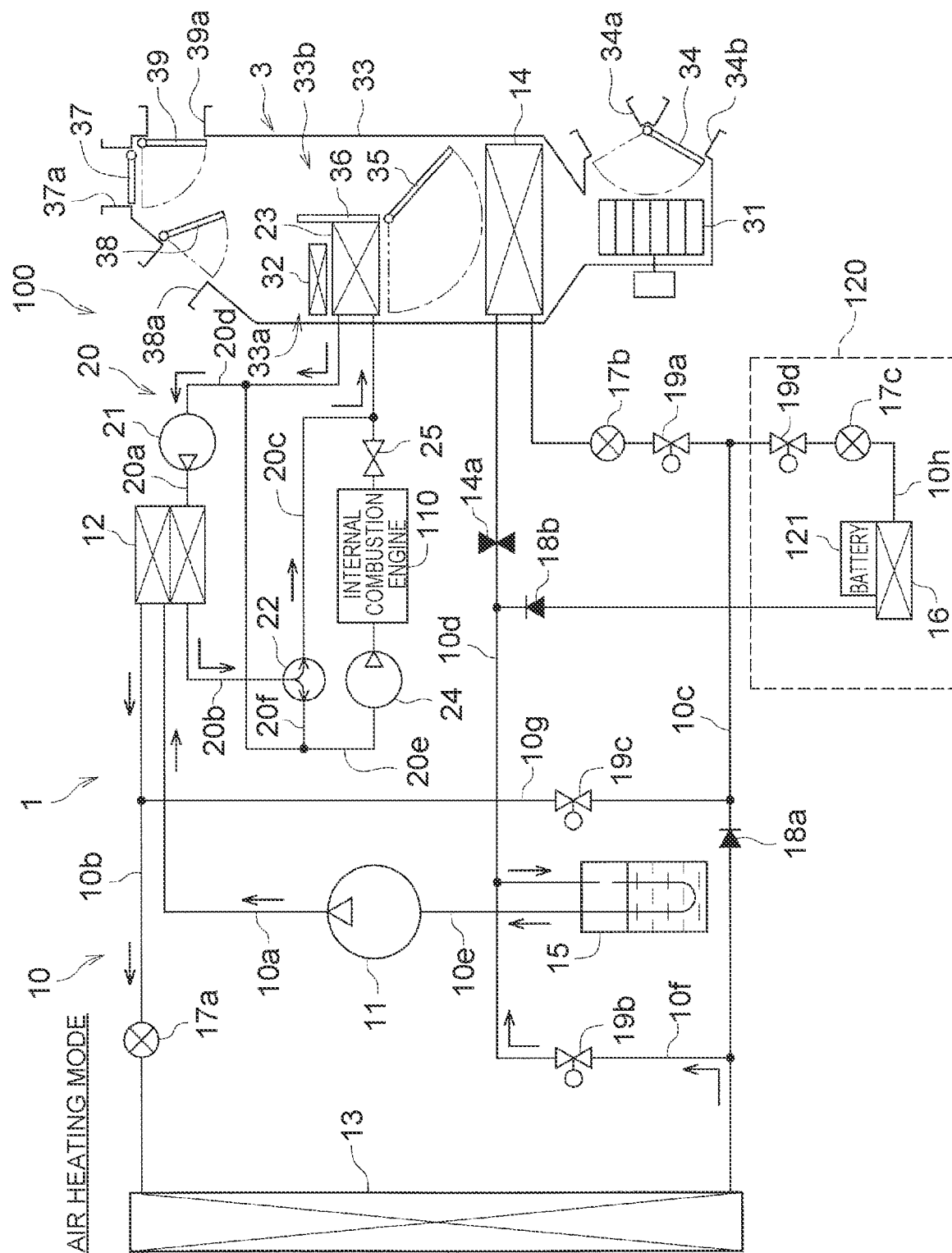
FIG. 4 is a diagram for describing a flow of the refrigerant in an air heating mode of the heat pump system in FIG. 1.

The air heating mode is a mode for heating the vehicle cabin by heating the blowing air. As shown in FIG. 4, in the air heating mode, by the air conditioner ECU 2 (see FIG. 2), the changeover valve 25 is closed, and the water pump 21 is driven in a state where the coolant inlet of the three-way valve 22 is connected to the one of the coolant outlets of the three-way valve 22. Thereby, the coolant discharged from the water pump 21 flows through the intermediate heat exchanger 12, the three-way valve 22 and the heater core 23 in this order, and returns to the water pump 21.

Further, by the air conditioner ECU 2, the solenoid valve 19b is opened, the solenoid valves 19a, 19c, 19d are closed, the compressor 11 is driven, and the expansion valve 17a is controlled in the throttling state. The expansion valves 17b, 17c may be closed, or may be opened.

Thereby, the refrigerant discharged from the compressor 11 flows through the intermediate heat exchanger 12, the expansion valve 17a, the outside heat exchanger 13, the solenoid valve 19b and the accumulator 15 in this order, and returns to the compressor 11. At this time, the intermediate heat exchanger 12 functions as a condenser, and the outside heat exchanger 13 functions as an evaporator. The coolant passing through the intermediate heat exchanger 12 is warmed by the condensation heat of the refrigerant in the intermediate heat exchanger 12. Then, in the heater core 23, heat exchange is performed between the coolant and the blowing air, and thereby the blowing air passing through the heater core 23 is warmed.

Serial Dehumidification Air-Heating Mode

Figure 5:
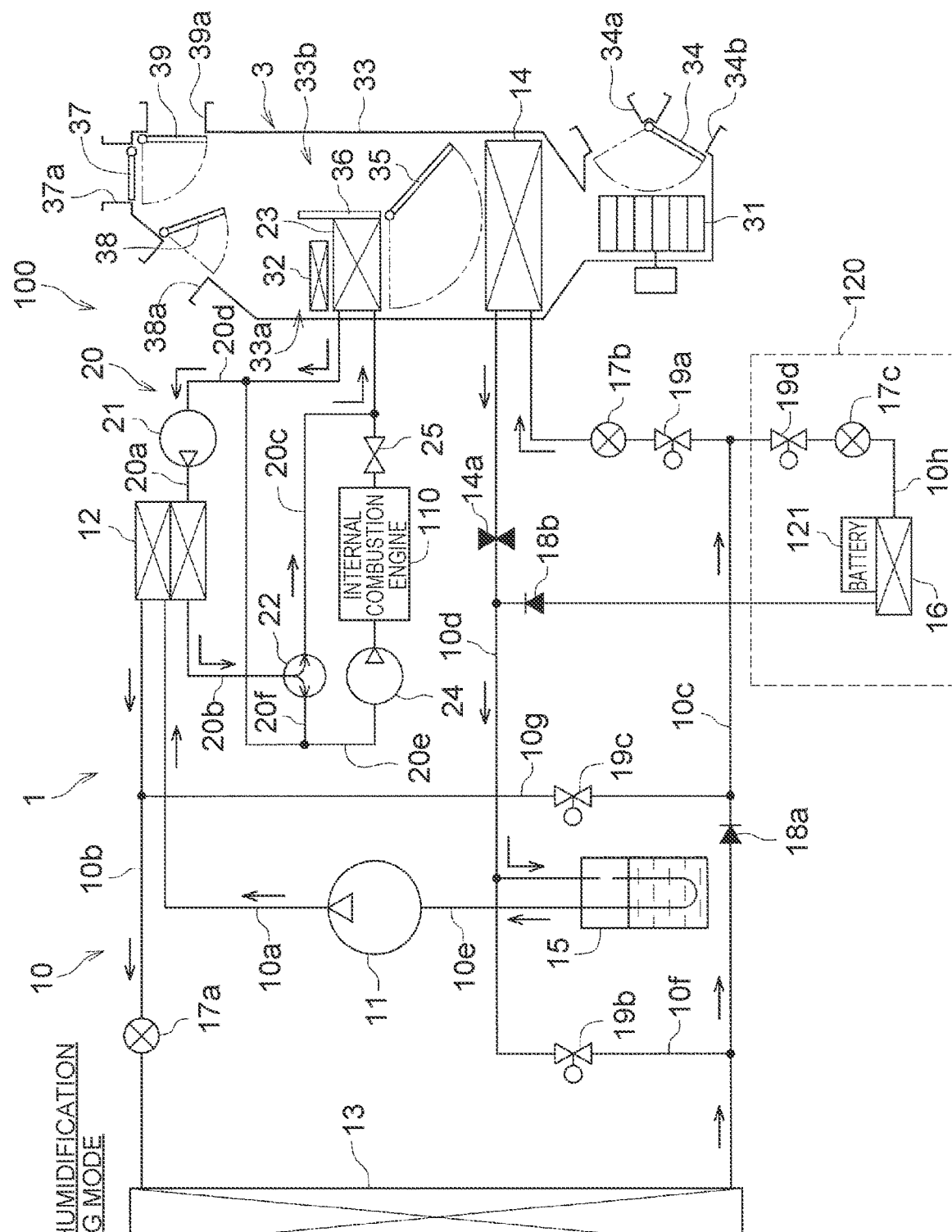
FIG. 5 is a diagram for describing a flow of the refrigerant in a serial dehumidification air-heating mode of the heat pump system in FIG. 1.

The serial dehumidification air-heating mode is a mode for dehumidifying and heating the vehicle cabin by cooling, dehumidifying and then heating the blowing air. As shown in FIG. 5, in the serial dehumidification air-heating mode, by the air conditioner ECU 2 (see FIG. 2), the changeover valve 25 is closed, and the water pump 21 is driven in the state where the coolant inlet of the three-way valve 22 is connected to the one of the coolant outlets of the three-way valve 22. Thereby, the coolant discharged from the water pump 21 flows through the intermediate heat exchanger 12, the three-way valve 22 and the heater core 23 in this order, and returns to the water pump 21.

Further, by the air conditioner ECU 2, the solenoid valve 19a is opened, the solenoid valves 19b to 19d are closed, the compressor 11 is driven, and the expansion valves 17a, 17b are controlled in the throttling state. The expansion valve 17c may be closed, or may be opened.

Thereby, the refrigerant discharged from the compressor 11 flows through the intermediate heat exchanger 12, the expansion valve 17a, the outside heat exchanger 13, the solenoid valve 19a, the expansion valve 17b, the inside heat exchanger 14 and the accumulator 15 in this order, and returns to the compressor 11. At this time, the intermediate heat exchanger 12 functions as a condenser, and the inside heat exchanger 14 functions as an evaporator. Further, in the case where the saturation temperature of the refrigerant in the outside heat exchanger 13 is higher than the temperature of the external air, the outside heat exchanger 13 functions as a condenser, and in the case where the saturation temperature of the refrigerant in the outside heat exchanger 13 is lower than the temperature of the external air, the outside heat exchanger 13 functions as an evaporator. The blowing air passing through the inside heat exchanger 14 is cooled and dehumidified by the vaporization heat of the refrigerant in the inside heat exchanger 14. The coolant passing through the intermediate heat exchanger 12 is warmed by the condensation heat of the refrigerant in the intermediate heat exchanger 12. Then, in the heater core 23, heat exchange is performed between the coolant and the blowing air, and thereby, after the dehumidification, the blowing air passing through the heater core 23 is warmed.

Parallel Dehumidification Air-Heating Mode

Figure 6:
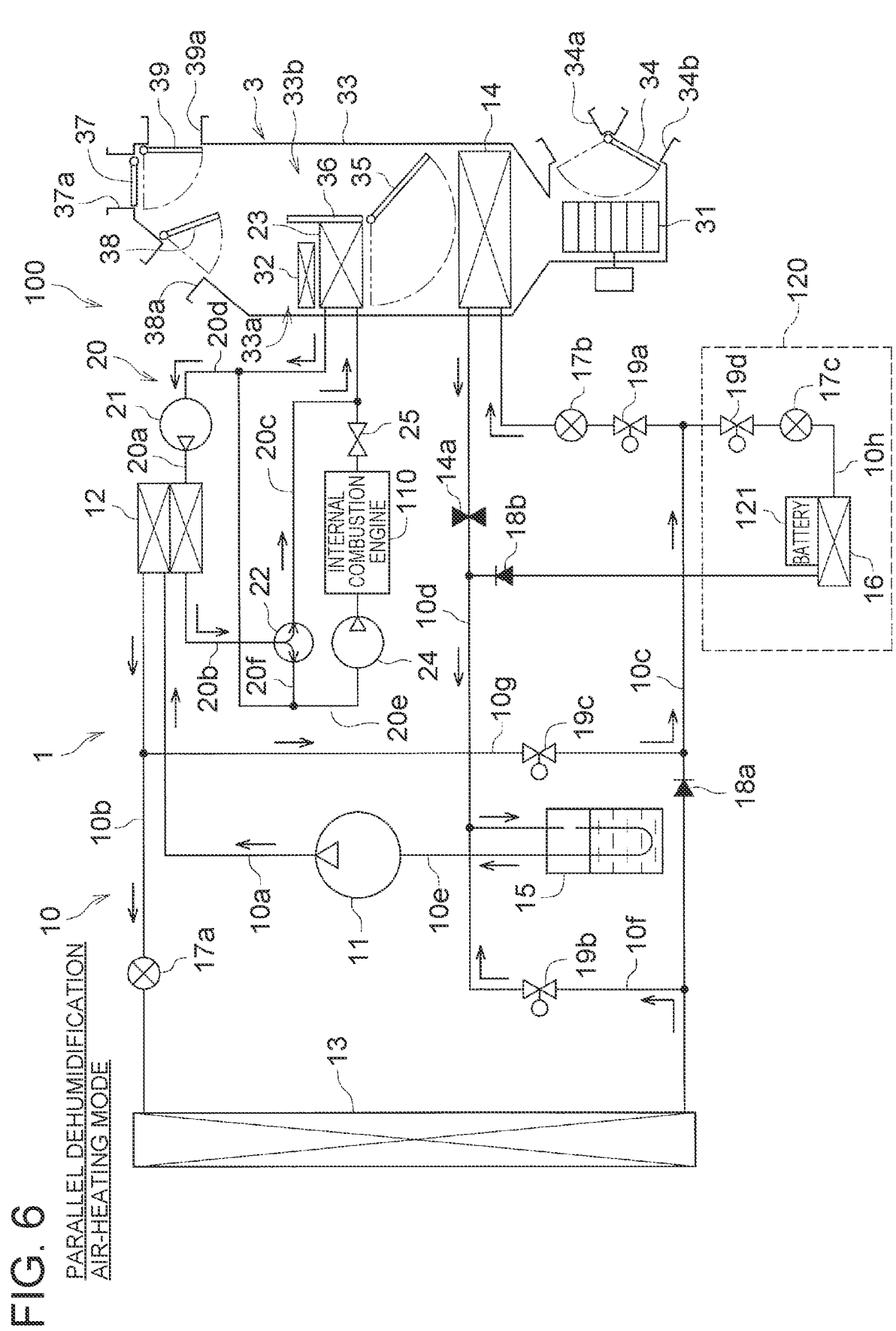
FIG. 6 is a diagram for describing a flow of the refrigerant in a parallel dehumidification air-heating mode of the heat pump system in FIG. 1.

The parallel dehumidification air-heating mode is a mode for dehumidifying and heating the vehicle cabin by cooling, dehumidifying and then heating the blowing air, and is a mode that has a higher air heating capacity than the serial dehumidification air-heating mode. As shown in FIG. 6, in the parallel dehumidification air-heating mode, by the air conditioner ECU 2 (see FIG. 2), the changeover valve 25 is closed, and the water pump 21 is driven in the state where the coolant inlet of the three-way valve 22 is connected to the one of the coolant outlets of the three-way valve 22. Thereby, the coolant discharged from the water pump 21 flows through the intermediate heat exchanger 12, the three-way valve 22 and the heater core 23 in this order, and returns to the water pump 21.

Further, by the air conditioner ECU 2, the solenoid valves 19a to 19c are opened, the solenoid valve 19d is closed, the compressor 11 is driven, and the expansion valves 17a, 17b are controlled in the throttling state. The expansion valve 17c may be closed, or may be opened.

Thereby, the refrigerant discharged from the compressor 11 flows through the intermediate heat exchanger 12, the expansion valve 17a, the outside heat exchanger 13, the solenoid valve 19b and the accumulator 15 in this order, and returns to the compressor 11. Further, the refrigerant discharged from the compressor 11 flows through the intermediate heat exchanger 12, the solenoid valves 19c, 19a, the expansion valve 17b, the inside heat exchanger 14 and the accumulator 15 in this order, and returns to the compressor 11. That is, the refrigerant having passed through the intermediate heat exchanger 12 is divided to a route along which the refrigerant returns to the compressor 11 through the expansion valve 17a and the outside heat exchanger 13 and a route along which the refrigerant returns to the compressor 11 through the expansion valve 17b and the inside heat exchanger 14. At this time, the intermediate heat exchanger 12 functions as a condenser, and the outside heat exchanger 13 and the inside heat exchanger 14 function as evaporators. The blowing air passing through the inside heat exchanger 14 is cooled and dehumidified by the vaporization heat of the refrigerant in the inside heat exchanger 14. The coolant passing through the intermediate heat exchanger 12 is warmed by the condensation heat of the refrigerant in the intermediate heat exchanger 12. Then, in the heater core 23, heat exchange is performed between the coolant and the blowing air, and thereby, after the dehumidification, the blowing air passing through the heater core 23 is warmed.

Battery-Only Cooling Mode

Figure 7:
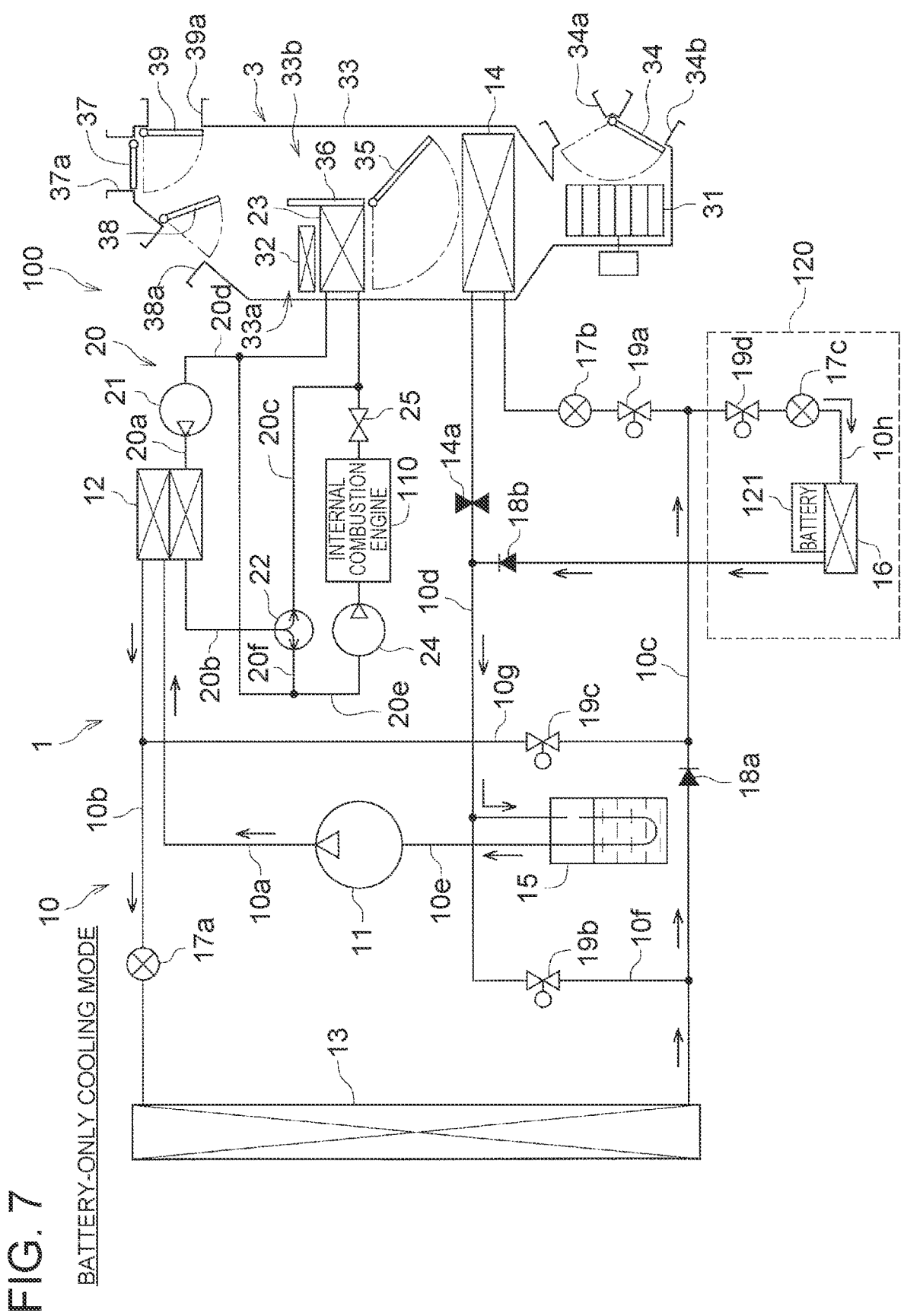
FIG. 7 is a diagram for describing a flow of the refrigerant in a battery-only cooling mode of the heat pump system in FIG. 1.

The battery-only cooling mode is a mode for cooling only the battery 121. As shown in FIG. 7, in the battery-only cooling mode, by the air conditioner ECU 2 (see FIG. 2), the solenoid valve 19d is opened, the solenoid valves 19a to 19c are closed, the expansion valve 17a is fully opened, the compressor 11 is driven, and the expansion valve 17c is controlled in the throttling state. The expansion valve 17b may be closed, or may be opened.

Thereby, the refrigerant discharged from the compressor 11 flows through the intermediate heat exchanger 12, the outside heat exchanger 13, the solenoid valve 19d, the expansion valve 17c, the battery heat exchanger 16 and the accumulator 15 in this order, and returns to the compressor 11. At this time, the outside heat exchanger 13 functions as a condenser, and the battery heat exchanger 16 functions as an evaporator. Therefore, the battery 121 is cooled by the vaporization heat of the refrigerant in the battery heat exchanger 16.

Air-Cooling Battery-Cooling Mode

Figure 8:
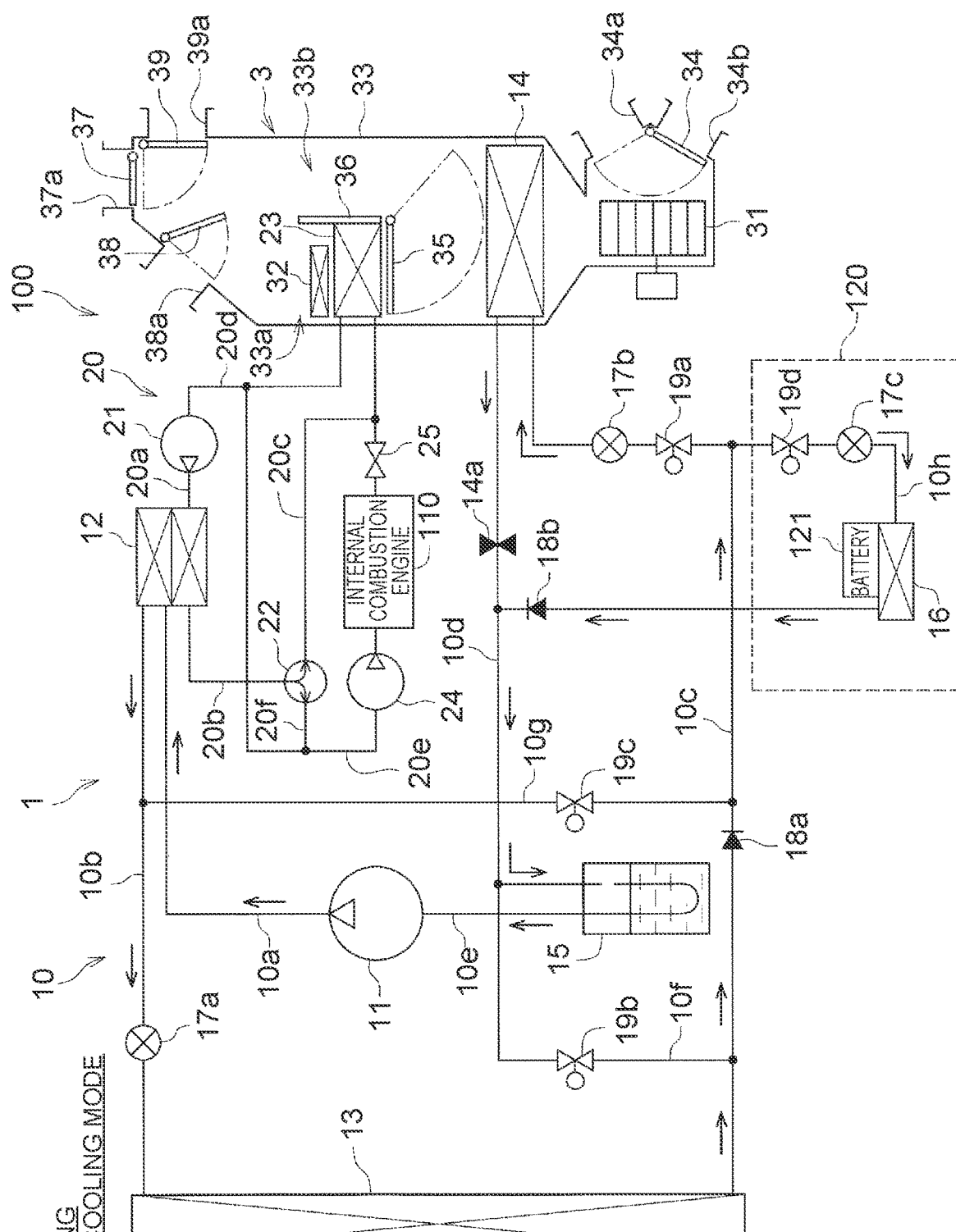
FIG. 8 is a diagram for describing a flow of the refrigerant in an air-cooling battery-cooling mode of the heat pump system in FIG. 1.

The air-cooling battery-cooling mode is a mode for cooling the battery 121 while cooling the blowing air and cooling the vehicle cabin. As shown in FIG. 8, in the air-cooling battery-cooling mode, by the air conditioner ECU 2 (see FIG. 2), the solenoid valves 19a, 19d are opened, the solenoid valves 19b, 19c are closed, the expansion valve 17a is fully opened, the compressor 11 is driven, and the expansion valves 17b, 17c are controlled in the throttling state.

Thereby, the refrigerant discharged from the compressor 11 flows through the intermediate heat exchanger 12, the outside heat exchanger 13, the solenoid valve 19a, the expansion valve 17b, the inside heat exchanger 14 and the accumulator 15 in this order, and returns to the compressor 11. Further, the refrigerant discharged from the compressor 11 flows through the intermediate heat exchanger 12, the outside heat exchanger 13, the solenoid valve 19d, the expansion valve 17c, the battery heat exchanger 16 and the accumulator 15 in this order, and returns to the compressor 11. That is, the refrigerant having passed through the outside heat exchanger 13 is divided to a route along which the refrigerant returns to the compressor 11 through the expansion valve 17b and the inside heat exchanger 14 and a route along which the refrigerant returns to the compressor 11 through the expansion valve 17c and the battery heat exchanger 16. At this time, the outside heat exchanger 13 functions as a condenser, and the inside heat exchanger 14 and the battery heat exchanger 16 function as evaporators. The blowing air passing through the inside heat exchanger 14 is cooled by the vaporization heat of the refrigerant in the inside heat exchanger 14, and the battery 121 is cooled by the vaporization heat of the refrigerant in the battery heat exchanger 16.

Battery Cooling Permission Determination

In the air conditioner ECU 2 in the embodiment, an air conditioning requirement is set as a condition for determining whether the cooling of the battery 121 is permitted. In the air conditioning requirement, whether the cooling of the battery is permitted is set depending on the operation mode of the heat pump system 1. That is, a condition for switching the operation mode to the battery-only cooling mode or the air-cooling battery-cooling mode is set depending on the operation mode at that time.

For example, a condition for permitting the cooling of the battery 121 in the air cooling mode and a condition for permitting the cooling of the battery 121 in the air heating mode are separately set. A condition for permitting the cooling of the battery 121 in the serial dehumidification air-heating mode and a condition for permitting the cooling of the battery 121 in the parallel dehumidification air-heating mode are the same as the condition for permitting the cooling of the battery 121 in the air heating mode. Thereby, it is possible to increase air conditioning comfort in the vehicle cabin while restraining deterioration in the battery 121. In the air cooling mode, the air heating mode, the serial dehumidification air-heating mode and the parallel dehumidification air-heating mode, the air conditioning in the vehicle cabin is performed by the heat pump system 1, when the internal combustion engine 110 is in the stop state. The air cooling mode is an example of the "air cooling mode" in the disclosure, each of the air heating mode, the serial dehumidification air-heating mode and the parallel dehumidification air-heating mode is an example of the "air heating mode" in the disclosure, and each of the battery-only cooling mode and the air-cooling battery-cooling mode is an example of the "battery cooling mode" in the disclosure.

As shown in FIG. 2, the battery ECU 6 is connected to a battery temperature sensor 61 that detects the temperature of the battery 121, and receives a detection result of battery temperature sensor 61. The battery ECU 6 is configured to decide a battery cooling request level depending on the temperature of the battery 121, and to output the decided battery cooling request level to the air conditioner ECU 2. For example, as the battery cooling request level, eight levels of "0" to "7" are set, and the battery cooling request level is higher as the temperature of the battery 121 is higher. Therefore, when the battery cooling request level is "0", the temperature of the battery 121 is low, and the cooling of the battery 121 is not requested. When the battery cooling request level is one of "1" to "7", the cooling of the battery 121 is requested because of increase in the temperature of the battery 121, and the degree of the request is higher as the level is higher. When the battery cooling request level is "6" or higher, it is necessary to immediately cool the battery 121.

The air conditioner ECU 2 is configured to determine whether to permit the cooling of the battery 121 based on the battery cooling request level that is input from the battery ECU 6, in the case of the air heating mode, the serial dehumidification air-heating mode or the parallel dehumidification air-heating mode. Specifically, the air conditioner ECU 2 is configured to permit the cooling of the battery 121 when the battery cooling request level is a level at which it is necessary to immediately cool the battery 121, in the case of the air heating mode, the serial dehumidification air-heating mode or the parallel dehumidification air-heating mode. That is, the air conditioner ECU 2 is set so as to permit the cooling of the battery 121, in the case where the battery cooling request level is "6" or higher.

The air conditioner ECU 2 is configured to determine whether to permit the cooling of the battery 121, based on an open-closed state of the blowing port 39a, an air cooling load, an air cooling preference time from a vehicle start-up, the temperature of the internal air, the temperature of the inside heat exchanger 14, the likelihood of fogging of the windshield, and a dehumidification capacity, in the air cooling mode.

The operation mode of the heat pump system 1 includes a defrosting mode, a my-room mode, a pre-air-conditioning mode and an idling mode.

In the defrosting mode, frost attached to the outside heat exchanger 13 is removed. In the defrosting mode, for example, the refrigerant of the refrigerant circuit 10 is circulated along the same route as that in the air cooling mode, and the frost is melted by the condensation heat in the outside heat exchanger 13. In the defrosting mode, the cooling of the battery 121 is prohibited for giving preference to the recovery of the capacity of the heat pump system 1.

In the my-room mode, in a state where an external power source (not illustrated) is connected to a plug-in hybrid vehicle, an in-vehicle electric load such as the vehicle air conditioner 100 can be used using electric power from the external power source. In the pre-air-conditioning mode, before a user gets in the vehicle, the vehicle air conditioner 100 is actuated, and the air conditioning of the vehicle cabin is previously performed. In the my-room mode and the pre-air-conditioning mode, the cooling of the battery 121 is prohibited.

In the idling mode, the internal combustion engine 110 is operated, and the heat pump system 1 is stopped. During the operation of the internal combustion engine 110, the vehicle cabin can be heated using exhaust heat of the internal combustion engine 110. Therefore, in the idling mode, the cooling of the battery 121 is permitted.

Battery Cooling Permission Determination Flow

Next, a battery cooling permission determination by the air conditioner ECU 2 in the embodiment will be described with reference to FIG. 9 to FIG. 11. Steps described below are executed by the air conditioner ECU 2.

Figure 9:
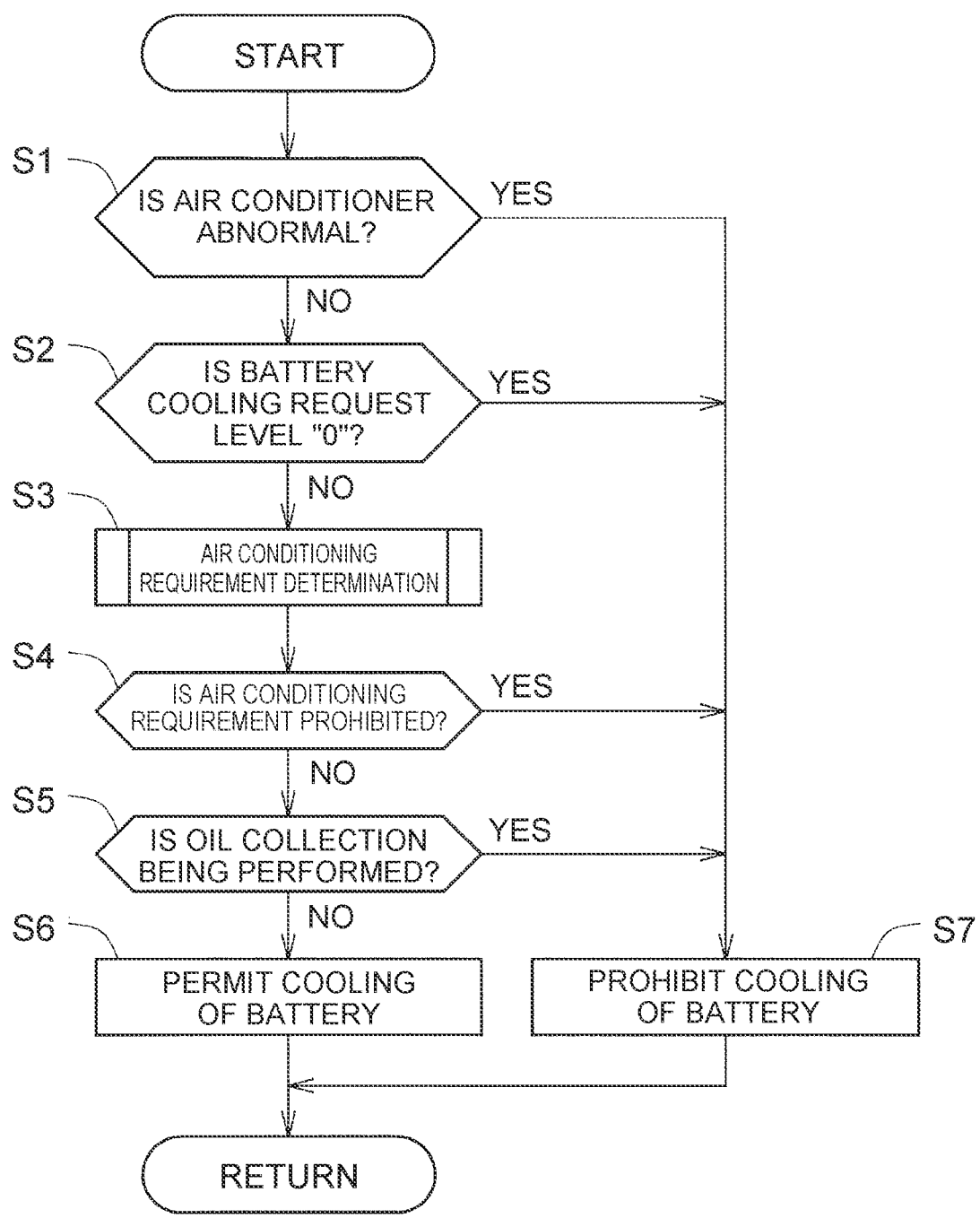
FIG. 9 is a flowchart for describing a battery cooling permission determination by the air conditioner ECU in the embodiment.

First, in step S1 of FIG. 9, it is determined whether the vehicle air conditioner 100 is abnormal. In the case where it is determined that the vehicle air conditioner 100 is abnormal, the process transitions to step S7. On the other hand, in the case where it is determined that the vehicle air conditioner 100 is not abnormal (in the case where the vehicle air conditioner 100 is normal), the process transitions to step S2, regardless of whether the vehicle air conditioner 100 is actuated or is not actuated.

Next, in step S2, it is determined whether the battery cooling request level is "0". The battery cooling request level is input from the battery ECU 6. The battery ECU 6 decides the battery cooling request level depending on the temperature of the battery 121. In the case where it is determined that the battery cooling request level is "0", the process transitions to step S7. On the other hand, in the case where it is determined that the battery cooling request level is not "0" (in the case where the battery cooling request level is one of "1" to "7"), the process transitions to step S3.

Next, in step S3, the air conditioning requirement is determined. The determination of the air conditioning requirement will be described later. As a determination result, a permission or a prohibition is output.

Next, in step S4, it is determined whether the determination result of the air conditioning requirement is prohibition. In the case where the determination result of the air conditioning requirement is prohibition, the process transitions to step S7. On the other hand, in the case where it is determined that the determination result of the air conditioning requirement is not prohibition (in the case where the determination result of the air conditioning requirement is permission), the process transitions to step S5.

Next, in step S5, it is determined whether an oil collection is being performed. The oil collection is to temporarily increase the rotation speed of the compressor 11 and return the refrigerating machine oil to the compressor 11 for solving an insufficient lubrication of the compressor 11. In the case where it is determined that the oil collection is being performed, the process transitions to step S7. On the other hand, in the case where it is determined that the oil collection is not being performed, the process transitions to step S6.

In step S6, the cooling of the battery 121 is permitted. For example, the operation mode of the heat pump system 1 is switched to the battery-only cooling mode or the air-cooling battery-cooling mode, and the cooling of the battery 121 is performed.

In step S7, the cooling of the battery 121 is prohibited. For example, the operation mode of the heat pump system 1 is not switched to the battery-only cooling mode and the air-cooling battery-cooling mode, and the cooling of the battery 121 is not performed.

Air Conditioning Requirement Determination

Figure 10:
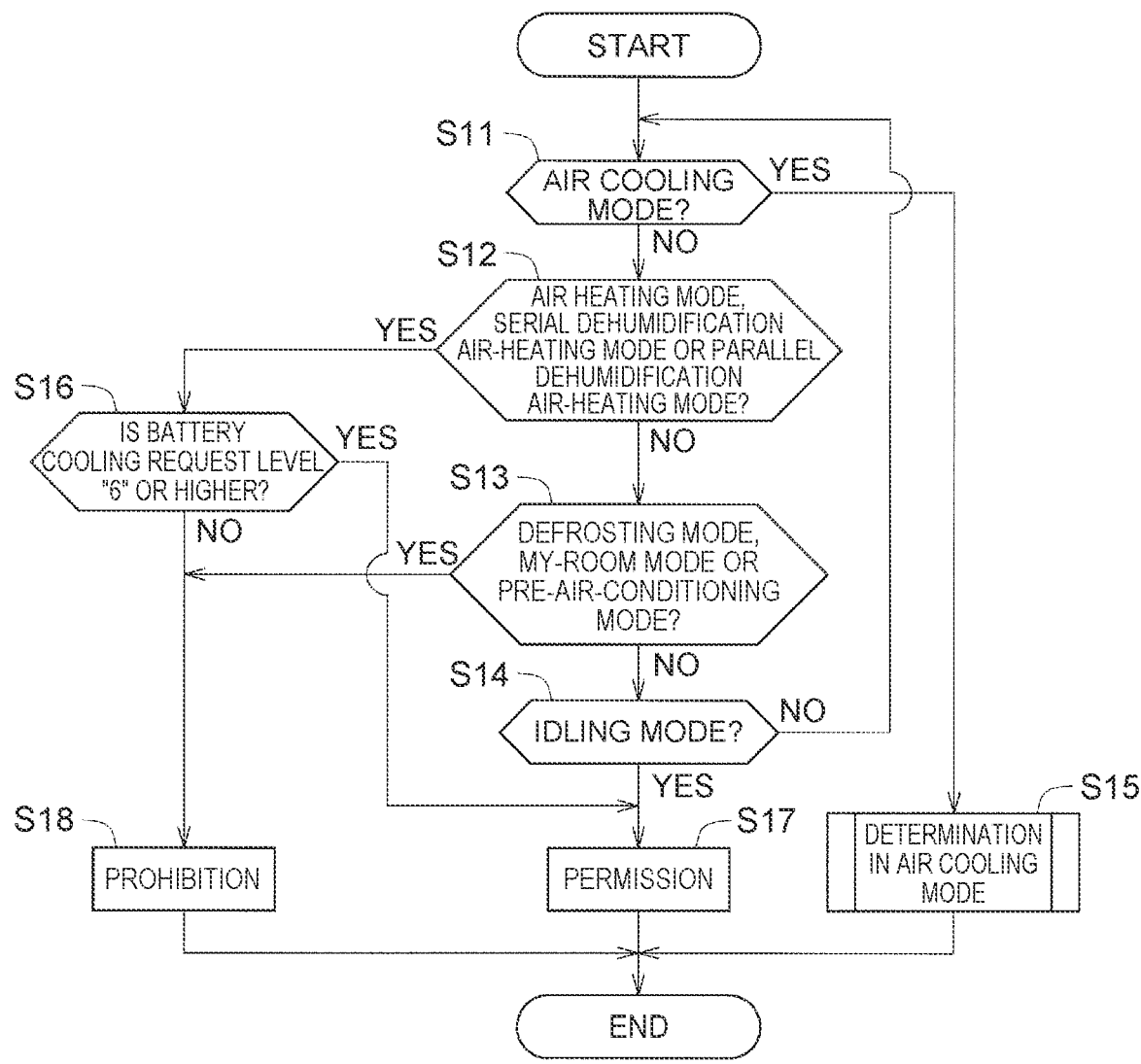
FIG. 10 is a flowchart for describing an air conditioning requirement determination in step S3 of FIG. 9.

In the air conditioning requirement determination, first, in step S11 of FIG. 10, it is determined whether the operation mode of the heat pump system 1 is the air cooling mode. In the case where it is determined that the operation mode is the air cooling mode, a determination in air cooling mode is performed in step S15. The determination in air cooling mode will be described later. On the other hand, in the case where it is determined that the operation mode is not the air cooling mode, the process transitions to step S12.

Next, in step S12, it is determined whether the operation mode of the heat pump system 1 is the air heating mode, the serial dehumidification air-heating mode or the parallel dehumidification air-heating mode. In the case where it is determined that the operation mode is the air heating mode, the serial dehumidification air-heating mode or the parallel dehumidification air-heating mode, the process transitions to step S16. On the other hand, in the case where it is determined that the operation mode is not the air heating mode, the serial dehumidification air-heating mode or the parallel dehumidification air-heating mode, the process transitions to step S13.

Next, in step S16, it is determined whether the battery cooling request level is "6" or higher. In the case where it is determined that the battery cooling request level is "6" or higher, permission is output as the determination result, in step S17. On the other hand, in the case where it is determined that the battery cooling request level is not "6" or higher (in the case where the battery cooling request level is "5" or lower), prohibition is output as the determination result, in step S18. That is, in the case of one of the air heating mode, the serial dehumidification air-heating mode and the parallel dehumidification air-heating mode, the cooling of the battery is permitted in the air conditioning requirement determination when the battery cooling request level is "6" or higher, and the cooling of the battery is prohibited in the air conditioning requirement determination when the battery cooling request level is "5" or lower.

In step S13, it is determined whether the operation mode of the heat pump system 1 is the defrosting mode, the my-room mode or the pre-air-conditioning mode. In the case where it is determined that the operation mode is the defrosting mode, the my-room mode or the pre-air-conditioning mode, prohibition is output as the determination result, in step S18. On the other hand, in the case where it is determined that the operation mode is not the defrosting mode, the my-room mode or the pre-air-conditioning mode, the process transitions to step S14.

Next, in step S14, it is determined whether the operation mode of the heat pump system 1 is the idling mode. In the case where it is determined that the operation mode is the idling mode, permission is output as the determination result, in step S17. On the other hand, in the case where it is determined that the operation mode is not the idling mode, the process transitions to step S11.

Determination in Air Cooling Mode

Figure 11:
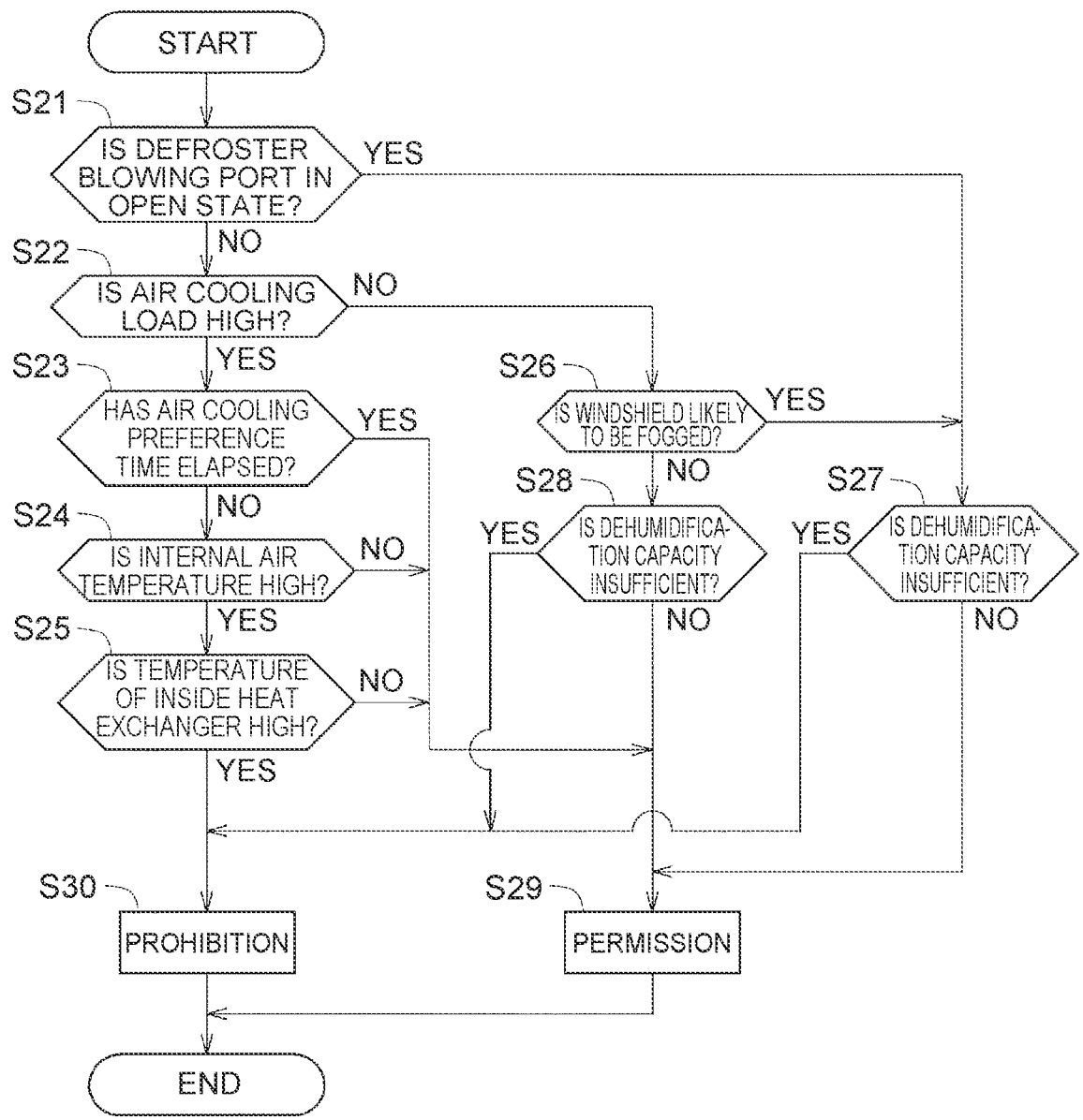
FIG. 11 is a flowchart for describing a determination in air cooling mode in step S15 of FIG. 10.

In the determination in air cooling mode, first, in step S21 of FIG. 11, it is determined whether the blowing port 39a is in an open state. For example, in the case where the blowing port mode is the defroster mode or the foot-defroster mode, it is determined that the blowing port 39a is in the open state. In the case where it is determined that the blowing port 39a is in the open state, the process transitions to step S27. On the other hand, in the case where it is determined that the blowing port 39a is not in the open state (in the case where the blowing port 39a is in a closed state), the process transitions to step S22.

Next, in step S22, it is determined whether the air cooling load is high. Details of the air cooling load determination will be described later. In the case where it is determined that the air cooling load is high, the process transitions to step S23. On the other hand, in the case where it is determined that the air cooling load is not high (in the case where the air cooling load is low), the process transitions to step S26.

Next, in step S23, it is determined whether an elapsed time from the vehicle start-up is longer than the air cooling preference time. Details of the air cooling preference time elapse determination will be described later. In the case where the elapsed time from the vehicle start-up is longer than the air cooling preference time, permission is output as the determination result, in step S29. On the other hand, in the case where it is determined that the elapsed time from the vehicle start-up is not longer than the air cooling preference time (in the case where the elapsed time from the vehicle start-up is equal to or shorter than the air cooling preference time), the process transitions to step S24.

Next, in step S24, it is determined whether the temperature of the internal air is high. Details of the internal air temperature determination will be described later. In the case where it is determined that the temperature of the internal air is high, the process transitions to step S25. On the other hand, in the case where it is determined that the temperature of the internal air is not high (in the case where the temperature of the internal air is low), permission is output as the determination result, in step S29.

Next, in step S25, it is determined whether the temperature of the inside heat exchanger 14 is high. Details of the vaporizer temperature determination will be described later. In the case where it is determined that the temperature of the inside heat exchanger 14 is high, prohibition is output as the determination result, in step S30. On the other hand, in the case where it is determined that the temperature of the inside heat exchanger 14 is not high (in the case where the temperature of the inside heat exchanger 14 is low), permission is output as the determination result, in step S29.

Further, in step S26, it is determined whether the windshield is likely to be fogged. Details of the fogging likelihood determination will be described later. In the case where the windshield is likely to be fogged, the process transitions to step S27. On the other hand, in the case where it is determined that the windshield is not likely to be fogged (in the case where the windshield is unlikely to be fogged), the process transitions to step S28.

Next, in step S27, the dehumidification capacity when the windshield is likely to be fogged is determined. Details of the dehumidification capacity determination when the windshield is likely to be fogged will be described later. In the case where it is determined that the dehumidification capacity is insufficient, prohibition is output as the determination result, in step S30. On the other hand, in the case where it is determined that the dehumidification capacity is not insufficient (in the case where the dehumidification capacity is sufficient), permission is output as the determination result, in step S29.

Further, in step S28, the dehumidification capacity when the windshield is unlikely to be fogged is determined. Details of the dehumidification capacity determination when the windshield is unlikely to be fogged will be described later. In the case where it is determined that the dehumidification capacity is insufficient, prohibition is output as the determination result, in step S30. On the other hand, in the case where it is determined that the dehumidification capacity is not insufficient (in the case where the dehumidification capacity is sufficient), permission is output as the determination result, in step S29.

Air Cooling Load Determination

The air cooling load is determined based on a target blowing temperature TAO. The target blowing temperature TAO is a target temperature of the air conditioner wind that is supplied into the vehicle cabin, and corresponds to an air cooling load that is requested in the vehicle air conditioner 100. The target blowing temperature TAO is calculated using Expression (1) described below.

$$TAO = k_{set} \times T_{set} - k_r \times T_r - k_{am} \times T_{am} - k_s \times T_s + E \quad (1)$$

In Expression (1), $T_{set}$ is the setting temperature in the vehicle cabin that is set by a temperature setting switch (not illustrated), $T_r$ is the temperature of the internal air that is detected by the internal air temperature sensor 51, $T_{am}$ is the temperature of the external air that is detected by the external air temperature sensor 52, and $T_s$ is the amount of insolation that is detected by the insolation sensor 53. Further, $k_{set}$, $k_r$, $k_{am}$ and $k_s$ are gains for the parameters, and E is a constant for correction.

For example, in the case where the target blowing temperature TAO is less than a predetermined value, it is determined that the air cooling load is high, and in the case where the target blowing temperature TAO is equal to or more than the predetermined value, it is determined that the air cooling load is low. In the case where it is determined that the air cooling load is high, the process transitions to the determination about the comfort in the vehicle cabin, and in the case where it is determined that the air cooling load is low, the process transitions to the determination about the dehumidification capacity. The predetermined value is a value that is preset for determining whether the air cooling load is high or low. For restraining the hunting of the determination result, a hysteresis may be set.

Air Cooling Preference Time Elapse Determination

An air cooling preference time Tp is a time (dehumidification allowance time) for which the cooling of the vehicle cabin is preferentially performed after the vehicle start-up. The air cooling preference time Tp is set to a short time when the battery cooling request level is high, and is set to a shorter time when the vehicle is traveling than when the vehicle is at a standstill. This is because preference may be given to the cooling in the vehicle cabin when the battery cooling request level is low and the load on the battery 121 is higher when the vehicle is traveling than when the vehicle is at a standstill. For example, the air cooling preference time Tp is set using Table 1 described below.

TABLE 1

|  |  | Battery cooling request level | | | | | | | |
|---|---|---|---|---|---|---|---|---|---|
|  |  | 0 | 1 | 2 | 3 | 4 | 5 | 6 | 7 |
| Air cooling preference time Tp | Standstill | t3 | t3 | t3 | t3 | t3 | t1 | 0 | 0 |
|  | Travel | t2 | t2 | t2 | t2 | t1 | t1 | 0 | 0 |

In Table 1, t1 to t3 are preset times, and t1<t2<t3 is satisfied. Whether the vehicle is traveling or at a standstill is determined based on vehicle speed, for example. That is, in the case where the vehicle speed is equal to or more than a predetermined value, it is determined that the vehicle is traveling, and in the case where the vehicle speed is less than the predetermined value, it is determined that the vehicle is at a standstill.

For example, in the case where the battery cooling request level is "1" and the vehicle is at a standstill, the air cooling preference time Tp is set to t3. In the case where the battery cooling request level is "1" and the vehicle is traveling, the air cooling preference time Tp is set to t2, which is shorter than t3. In the case where the battery cooling request level is "5" and the vehicle is at a standstill, the air cooling preference time Tp is set to t1, which is shorter than t3.

That is, the air cooling preference time Tp is set based on the battery cooling request level and the traveling state (standstill or travel), and it is determined whether the set air cooling preference time Tp has elapsed. Then, in the case where the elapsed time from the vehicle start-up is longer than the air cooling preference time Tp, the determination result of the air conditioning requirement is permission, and the cooling of the battery 121 is preferentially performed.

In the case where the battery cooling request level is "6" or higher, the air cooling preference time Tp is set to "0". Therefore, it is determined that the air cooling preference time Tp has elapsed, so that the determination result of the air conditioning requirement is permission. That is, in the case where the battery cooling request level is "6" or higher, the cooling of the battery 121 is preferentially performed regardless of the elapsed time from the vehicle start-up.

Internal Air Temperature Determination

The internal air temperature determination is performed based on an internal air temperature Tsj for determination that results from the correction of the temperature of the internal air. The internal air temperature Tsj for determination is calculated using Expression (2) described below.

$$Tsj = T_r - A \quad (2)$$

In Expression (2), $T_r$ is the temperature of the internal air that is detected by the internal air temperature sensor 51, and A is a correction value and is set based on the battery cooling request level and the traveling state. For example, the correction value A is set using Table 2 described below.

TABLE 2

| | | Battery cooling request level | | | | | | | |
|---|---|---|---|---|---|---|---|---|---|
| | | 0 | 1 | 2 | 3 | 4 | 5 | 6 | 7 |
| Correction value A | Standstill | a1 | a1 | a2 | a2 | a2 | a3 | a4 | a5 |
| | Travel | a2 | a2 | a2 | a2 | a2 | a3 | a4 | a5 |

TABLE 3

| | Battery cooling request level | | | | | | | |
|---|---|---|---|---|---|---|---|---|
| | 0 | 1 | 2 | 3 | 4 | 5 | 6 | 7 |
| Correction value B | b1 | b1 | b1 | b1 | b1 | b2 | b3 | b3 |

In Table 2, a1 to a5 are preset values, and a1<<a2<a3<a4<a5 is satisfied. Further, a1 is a negative value having a large absolute value, a2 is zero, and a3 to a5 are positive value. The traveling state is determined in the above-described manner, for example. For example, in the case where the battery cooling request level is "1" and the vehicle is at a standstill, the correction value A is set to a1.

For example, in the case where the internal air temperature Tsj for determination is less than a predetermined value, it is determined that the temperature of the internal air is low, and in the case where the internal air temperature Tsj for determination is equal to or more than the predetermined value, it is determined that the temperature of the internal air is high. In the case where the temperature of the internal air is high, it is desirable to cool down the vehicle cabin. In the case where the temperature of the internal air is low, the temperature in the vehicle cabin is in a steady state, and it is not necessary to cool down the vehicle cabin. Therefore, the determination result of the air conditioning requirement is permission, and the cooling of the battery 121 is permitted. The predetermined value is a value that is preset for determining whether the temperature of the internal air is high or low. For restraining the hunting of the determination result, a hysteresis may be set.

As the battery cooling request level is higher, the correction value A is larger, and therefore it is more likely to be determined that the temperature of the internal air is low. That is, in the internal air temperature determination, as the battery cooling request level is higher, the determination result of the air conditioning requirement is more likely to be permission. Further, in the case where the battery cooling request level is "1" and the vehicle is at a standstill, the correction value A is set to a1, and it is determined that the temperature of the internal air is high because a1 is a negative value having a large absolute value. That is, in the case where the battery cooling request level is "1" and the vehicle is at a standstill, the cool-down of the vehicle cabin is preferentially performed.

Vaporizer Temperature Determination

The vaporizer temperature determination is performed based on a vaporizer temperature Tej for determination. The vaporizer temperature Tej for determination is calculated using Expression (3) described below.

$$Tej = TE - (TEO + B) \quad (3)$$

In Expression (3), TE is the temperature (vaporizer temperature) of the inside heat exchanger 14 that is detected by the temperature sensor 44. TEO is a target vaporizer temperature, and is set based on the target blowing temperature TAO, for example. B is a correction value, and is set based on the battery cooling request level. That is, the vaporizer temperature Tej for determination is a value that results from correcting the difference between the actual vaporizer temperature and the target vaporizer temperature depending on the battery cooling request level. For example, the correction value B is set using Table 3 described below.

In Table 3, b1 to b3 are preset values, and b1<b2<<b3 is satisfied. Further, b3 is a value that is much larger than b2. For example, in the case where the battery cooling request level is "1", the correction value B is set to b1.

For example, in the case where the vaporizer temperature Tej for determination is equal to or more than a predetermined value, it is determined that the temperature of the inside heat exchanger 14 is high, and in the case where the vaporizer temperature Tej for determination is less than the predetermined value, it is determined that the temperature of the inside heat exchanger 14 is low. In the case where the temperature of the inside heat exchanger 14 is high (in the case where the difference between the actual vaporizer temperature and the target vaporizer temperature is large), the determination result of the air conditioning requirement is prohibition, and the cool-down of the vehicle cabin is preferentially performed. In the case where the temperature of the inside heat exchanger 14 is low (in the case where the difference between the actual vaporizer temperature and the target vaporizer temperature is small), the determination result of the air conditioning requirement is permission, and the cooling of the battery 121 is permitted. The predetermined value is a value that is preset for determining whether the vaporizer temperature is high or low. For restraining the hunting of the determination result, a hysteresis may be set.

As the battery cooling request level is higher and the correction value B is larger, it is more likely to be determined that the temperature of the inside heat exchanger 14 is low. That is, in the vaporizer temperature determination, in the case where the battery cooling request level is high, the determination result of the air conditioning requirement is more likely to be permission than in the case where the battery cooling request level is low. Further, in the case where the battery cooling request level is "6" or higher, the correction value B is set to b3, and it is determined that the temperature of the inside heat exchanger 14 is low because b3 is a very large value.

Fogging Likelihood Determination

The likelihood of fogging is determined based on a relative humidity (hereinafter, referred to as a "windshield surface relative humidity") RHW of the air near the windshield in the vehicle cabin. The windshield surface relative humidity RHW is an index indicating the possibility of the fogging of the windshield, and is calculated based on the detection result of the window surface humidity sensor 54.

For example, in the case where the windshield surface relative humidity RHW is equal to or more than a predetermined value, it is determined that the windshield is likely to be fogged, and in the case where the windshield surface relative humidity RHW is less than the predetermined value, it is determined that the windshield is unlikely to be fogged. The predetermined value is a value that is preset for determining whether the possibility of the fogging of the windshield is high or low. For restraining the hunting of the determination result, a hysteresis may be set.

Dehumidification Capacity Determination When Windshield is Likely to Be Fogged

A dehumidification capacity determination when the windshield is likely to be fogged is performed based on a dehumidification capacity Pa. The dehumidification capacity Pa is calculated using Expression (4) described below.

$$Pa = TE - (TEO + C) \quad (4)$$

In Expression (4), TE and TEO are the same as TE and TEO in Expression (3). That is, the dehumidification capacity Pa is calculated using the difference between the actual vaporizer temperature and the target vaporizer temperature. C is a correction value, and is set based on the battery cooling request level.

Figure 12:
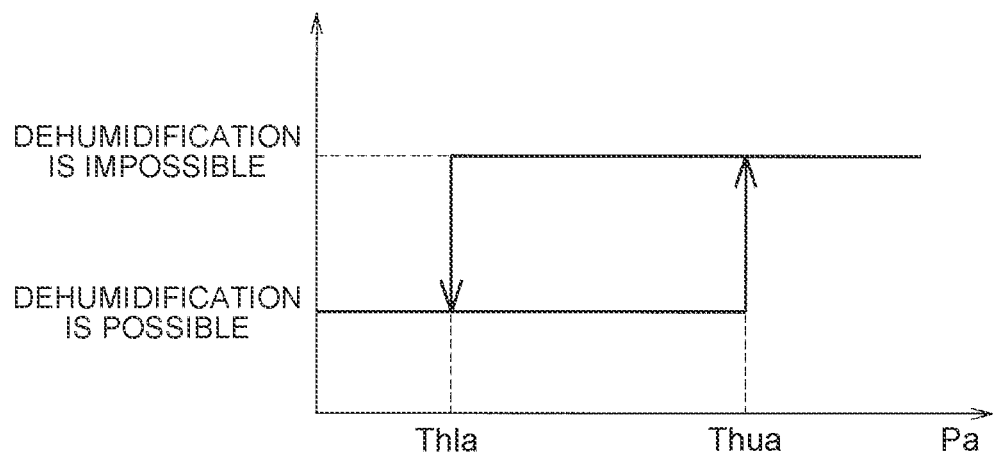
FIG. 12 is a diagram for describing a dehumidification capacity determination when a windshield is likely to be fogged.

As shown in FIG. 12, a lower threshold Thla and upper threshold Thua for dehumidification capacity determination are set. The lower threshold Thla is a preset value that is smaller than the upper threshold Thua. The upper threshold Thua is set based on the battery cooling request level.

For example, the correction value C and the upper threshold Thua are set using Table 4 described below.

TABLE 4

|  | Battery cooling request level | | | | | | | |
|---|---|---|---|---|---|---|---|---|
|  | 0 | 1 | 2 | 3 | 4 | 5 | 6 | 7 |
| Correction value C | c1 | c1 | c1 | c1 | c1 | c2 | c3 | c3 |
| Upper threshold Thua | ct1 | ct1 | ct1 | ct1 | ct1 | ct2 | ct2 | ct2 |

In Table 4, c1 to c3 are preset values, and c1<c2<<c3 is satisfied. Further, c3 is a value that is much larger than c2. For example, in the case where the battery cooling request level is "1", the correction value C is set to c1. Further, ct1 and ct2 are preset values, and ct1<ct2 is satisfied. For example, in the case where the battery cooling request level is "1", the upper threshold Thua is set to ct1.

As shown in FIG. 12, in a period after the dehumidification capacity Pa becomes equal to or more than the upper threshold Thua and before the dehumidification capacity Pa becomes equal to or less than the lower threshold Thla, it is determined that the dehumidification capacity is insufficient, and in a period after the dehumidification capacity Pa becomes equal to or less than the lower threshold Thla and before the dehumidification capacity Pa becomes equal to or more than the upper threshold Thua, it is determined that the dehumidification capacity is not insufficient. In the case where the dehumidification capacity is insufficient, the determination result of the air conditioning requirement is prohibition, and preference is given to the securement of the dehumidification capacity. In the case where the dehumidification capacity is not insufficient, the determination result of the air conditioning requirement is permission, and the cooling of the battery 121 is permitted.

When the battery cooling request level is high and the correction value C is large, it is likely to be determined that the dehumidification capacity is not insufficient. That is, in the dehumidification capacity determination, in the case where the battery cooling request level is high, the determination result of the air conditioning requirement is more likely to be permission than in the case where the battery cooling request level is low. Further, in the case where the battery cooling request level is high, the upper threshold Thua is large, and therefore it is unlikely to transition from a state where the dehumidification is possible to a state where the dehumidification is impossible. That is, in the case where the battery cooling request level is high, the determination result of the air conditioning requirement is more unlikely to change from permission to prohibition than in the case where the battery cooling request level is low. Further, in the case where the battery cooling request level is "6" or higher, the correction value C is set to c3, and it is determined that the dehumidification capacity is not insufficient because c3 is a very large value. That is, in the case where the battery cooling request level is "6" or higher, it is forcibly determined that the dehumidification capacity is not insufficient, regardless of the actual dehumidification capacity. Then, the determination result of the air conditioning requirement is permission, and the cooling of the battery 121 is preferentially performed.

Dehumidification Capacity Determination When Windshield is Unlikely to Be Fogged A dehumidification capacity determination when the windshield is unlikely to be fogged is performed based on a dehumidification capacity Pb. The dehumidification capacity Pb is calculated using Expression (5) described below.

$$Pb = TE - (TEO + D) \quad (5)$$

In Expression (5), TE and TEO are the same as TE and TEO in Expression (3). That is, the dehumidification capacity Pb is calculated using the difference between the actual vaporizer temperature and the target vaporizer temperature. D is a correction value, and is set based on the battery cooling request level.

Figure 13:
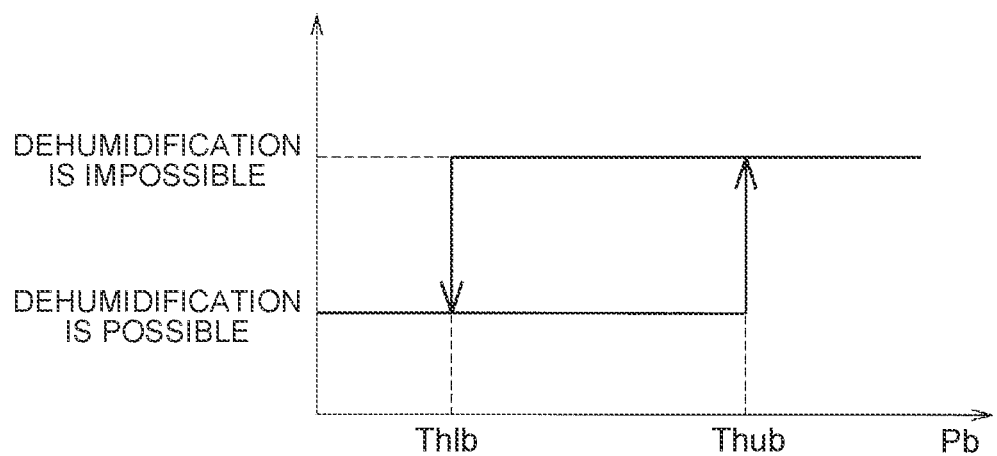
FIG. 13 is a diagram for describing a dehumidification capacity determination when the windshield is unlikely to be fogged.

As shown in FIG. 13, a lower threshold Thlb and an upper threshold Thub for dehumidification capacity determination are set. The lower threshold Thlb is a preset value that is smaller than the upper threshold Thub. The upper threshold Thub is set based on the battery cooling request level.

For example, the correction value D and the upper threshold Thub are set using Table 5 described below.

TABLE 5

|  | Battery cooling request level | | | | | | | |
|---|---|---|---|---|---|---|---|---|
|  | 0 | 1 | 2 | 3 | 4 | 5 | 6 | 7 |
| Correction value D | d1 | d1 | d1 | d1 | d1 | d2 | d3 | d3 |
| Upper threshold Thub | dt1 | dt1 | dt1 | dt1 | dt1 | dt2 | dt2 | dt2 |

In Table 5, d1 to d3 are preset values, and d1<d2<<d3 is satisfied. Further, d3 is a value that is much larger than d2. Further, d1>c1 is satisfied, d2>c2 is satisfied, and d3=c3 is satisfied. For example, in the case where the battery cooling request level is "1", the correction value D is set to d1. Further, dt1 and dt2 are preset values, and dt1<dt2 is satisfied. Further, dt1>ct1 is satisfied, and dt2>ct2 is satisfied. For example, in the case where the battery cooling request level is "1", the upper threshold Thub is set to dt1.

As shown in FIG. 13, in a period after the dehumidification capacity Pb becomes equal to or more than the upper threshold Thub and before the dehumidification capacity Pb becomes equal to or less than the lower threshold Thlb, it is determined that the dehumidification capacity is insufficient, and in a period after the dehumidification capacity Pb becomes equal to or less than the lower threshold Thlb and before the dehumidification capacity Pb becomes equal to or more than the upper threshold Thub, it is determined that the dehumidification capacity is not insufficient. In the case where the dehumidification capacity is insufficient, the determination result of the air conditioning requirement is prohibition, and preference is given to the securement of the dehumidification capacity. In the case where the dehumidification capacity is not insufficient, the determination result of the air conditioning requirement is permission, and the cooling of the battery 121 is permitted.

When the battery cooling request level is high and the correction value D is large, it is likely to be determined that the dehumidification capacity is not insufficient. That is, in the dehumidification capacity determination, in the case where the battery cooling request level is high, the determination result of the air conditioning requirement is more likely to be permission than in the case where the battery cooling request level is low. Further, in the case where the battery cooling request level is high, the upper threshold Thub is large, and therefore it is unlikely to transition from the state where the dehumidification is possible to the state where the dehumidification is impossible. That is, in the case where the battery cooling request level is high, the determination result of the air conditioning requirement is more unlikely to change from permission to prohibition than in the case where the battery cooling request level is low. Further, in the case where the battery cooling request level is "6" or higher, the correction value D is set to d3, and it is determined that the dehumidification capacity is not insufficient because d3 is a very large value. That is, in the case where the battery cooling request level is "6" or higher, it is forcibly determined that the dehumidification capacity is not insufficient, regardless of the actual dehumidification capacity. Then, the determination result of the air conditioning requirement is permission, and the cooling of the battery 121 is preferentially performed.

Moreover, because of d1>c1 and d2>c2, in the case where the windshield is unlikely to be fogged, it is more likely to be determined that the dehumidification capacity is not insufficient, than in the case where the windshield is likely to be fogged. Further, because of dt1>ct1 and dt2>ct2, in the case where the windshield is unlikely to be fogged, it is more unlikely to transition from the state where the dehumidification is possible to the state where the dehumidification is impossible, than in the case where the windshield is likely to be fogged.

Effect

In the embodiment, as described above, the condition for permitting the cooling of the battery 121 is set depending on the operation mode of the heat pump system 1. Thereby, the cooling of the battery 121 is permitted at an appropriate timing depending on the operation mode, so that it is possible to increase the air conditioning comfort in the vehicle cabin while restraining the deterioration in the battery 121.

Specifically, in the case of the air heating mode, the serial dehumidification air-heating mode or the parallel dehumidification air-heating mode, whether the cooling of the battery is permitted is determined based on the battery cooling request level. Further, in the case where the battery cooling request level is "6" or higher, the cooling of the battery 121 is permitted, and in the case where the battery cooling request level is "5" or lower, the cooling of the battery is prohibited. That is, in the case of the air heating mode, the serial dehumidification air-heating mode or the parallel dehumidification air-heating mode, the cooling of the battery is permitted when the battery cooling request level is a level at which it is necessary to immediately cool the battery 121 ("6" or higher). Thereby, the heating or dehumidification heating in the vehicle cabin is performed until the immediate cooling of the battery 121 becomes necessary, so that it is possible to increase the air conditioning comfort in the vehicle cabin. When the immediate cooling of the battery 121 becomes necessary, the cooling of the battery is permitted, so that it is possible to restrain the deterioration in the battery 121.

Further, in the case of the air cooling mode, whether the cooling of the battery is permitted is determined based on the open-closed state of the blowing port 39a, the air cooling load, the air cooling preference time from the vehicle start-up, the temperature of the internal air, the temperature of the inside heat exchanger 14, the likelihood of the fogging of the windshield, and the dehumidification capacity.

For example, in the case where the blowing port 39a is in the open state in the air cooling mode, the cooling of the battery is permitted when the dehumidification capacity is not insufficient, and the cooling of the battery is prohibited when the dehumidification capacity is insufficient. Further, in the case where the blowing port 39a is in the closed state and the air cooling load is low in the air cooling mode, the cooling of the battery is permitted when the dehumidification capacity is not insufficient, and the cooling of the battery is prohibited when the dehumidification capacity is insufficient. Thereby, when the dehumidification is possible, the cooling of the battery is permitted, and when the dehumidification is impossible, the cooling of the battery is prohibited, so that it is possible to give preference to the securement of the dehumidification capacity. Further, in the case where the battery cooling request level is "6" or higher, it is forcibly determined that the dehumidification capacity is not insufficient, regardless of the actual dehumidification capacity, and thereby the cooling of the battery is permitted, so that it is possible to preferentially perform the cooling of the battery. By determining the dehumidification capacity depending on the likelihood of the fogging, it is possible to increase the accuracy of the determination of the dehumidification capacity.

In the case where the blowing port 39a is in the closed state, the air cooling load is high and the elapsed time from the vehicle start-up is longer than the air cooling preference time in the air cooling mode, the cooling of the battery is permitted, so that it is possible to preferentially perform the cooling of the battery. Further, in the case where the battery cooling request level is high, the air cooling preference time is set to a short time, and in the case where the vehicle is traveling, the air cooling preference time is set to a shorter time than in the case where the vehicle is at a standstill. Thereby, it is possible to set an appropriate air cooling preference time depending on the temperature and load of the battery 121. Further, in the case where the battery cooling request level is "6" or higher, the air cooling preference time is set to "0". Thereby, it is determined that the elapsed time from the vehicle start-up is longer than the air cooling preference time, and thereby the cooling of the battery is permitted, so that it is possible to preferentially perform the cooling of the battery.

In the case where the blowing port 39a is in the closed state, the air cooling load is high, the elapsed time from the vehicle start-up is not longer than the air cooling preference time and the temperature of the internal air is low in the air cooling mode (in the case where the temperature of the internal air is in the steady state and it is not necessary to cool down the vehicle cabin), the cooling of the battery is permitted. That is, in the case where the temperature of the internal air is low, the cooling of the battery is permitted because the comfort in the vehicle cabin is sufficient.

In the case where the blowing port 39a is in the closed state, the air cooling load is high, the elapsed time from the vehicle start-up is not longer than the air cooling preference time, the temperature of the internal air is high and the temperature of the inside heat exchanger 14 is low in the air cooling mode (in the case where the difference between the actual vaporizer temperature and the target vaporizer temperature is small), the cooling of the battery is permitted. That is, in the case where the temperature of the inside heat exchanger 14 is low, the cooling of the battery is permitted because the air cooling capacity is sufficient.

In the case where the blowing port 39a is in the closed state, the air cooling load is high, the elapsed time from the vehicle start-up is not longer than the air cooling preference time, the temperature of the internal air is high and the temperature of the inside heat exchanger 14 is high in the air cooling mode, the cooling of the battery is prohibited, so that it is possible to give preference to the improvement in the comfort in the vehicle cabin.

Accordingly, in the case of the air cooling mode, as described above, the cooling of the battery is permitted at an appropriate timing, so that it is possible to increase the air conditioning comfort in the vehicle cabin while restraining the deterioration in the battery 121. In the case were the battery cooling request level is "6" or higher, the cooling of the battery is permitted even in the air cooling mode.

In the case of the defrosting mode, the cooling of the battery is prohibited, so that it is possible to give preference to the recovery of the capacity of the heat pump system 1.

In the case of the my-room mode or the pre-air-conditioning mode, the cooling of the battery is prohibited, so that it is possible to give preference to the comfort in the vehicle cabin.

In the idling mode, the vehicle cabin can be heated using the exhaust heat of the internal combustion engine 110, and therefore the cooling of the battery 121 is permitted.

Other Embodiments

The embodiment in this disclosure is an example in every respect, and does not cause the limitation of the interpretation. Accordingly, the technical scope of the disclosure is not interpreted based only on the above embodiment, and is specified based on the description in the claims. Further, the technical scope of the disclosure includes all modifications in a meaning and scope equivalent to the claims.

For example, in the example shown in the above embodiment, the vehicle air conditioner in the disclosure is applied to the plug-in hybrid vehicle that includes the internal combustion engine 110 and the electric motor (not illustrated) as the drive force source for vehicle travel. However, without being limited to this, the vehicle air conditioner in the disclosure may be applied to an electric vehicle that includes only the electric motor as the drive force source for vehicle travel.

In the example shown in the above embodiment, the intermediate heat exchanger 12 is provided, and the condensation heat in the intermediate heat exchanger 12 is transmitted to the blowing air through the coolant. However, without being limited to this, an inside condenser may be provided in the casing of the inside air conditioning unit, instead of the intermediate heat exchanger, and the blowing air may be warmed by the condensation heat in the inside condenser. In this case, the inside condenser is an example of the "air-heating heat exchanger" in the disclosure.

In the example shown in the above embodiment, the battery 121 is directly cooled by the vaporization heat in the battery heat exchanger 16. However, without being limited to this, a coolant circuit for battery cooling may be provided, and the coolant of the coolant circuit may be cooled by the battery heat exchanger. That is, the battery may be indirectly cooled through the coolant.

In the example shown in the above embodiment, the condition for permitting the cooling of the battery in the serial dehumidification air-heating mode and the parallel dehumidification air-heating mode is the same as the condition for permitting the cooling of the battery in the air heating mode. However, without being limited to this, the condition for permitting the cooling of the battery may be different among the air heating mode, the serial dehumidification air-heating mode and the parallel dehumidification air-heating mode.

In the example shown in the above embodiment, in the case of the air heating mode, the serial dehumidification air-heating mode or the parallel dehumidification air-heating mode, whether the cooling of the battery is permitted is determined based on the battery cooling request level. However, without being limited to this, in the case of the air heating mode, the serial dehumidification air-heating mode or the parallel dehumidification air-heating mode, whether the cooling of the battery is permitted may be determined based on a condition other than the battery cooling request level.

In the example shown in the above embodiment, in the case of the air cooling mode, whether the cooling of the battery is permitted is determined based on the open-closed state of the defroster blowing port, the air cooling load, the air cooling preference time from the vehicle start-up, the temperature of the internal air, the temperature of the inside heat exchanger 14, the likelihood of the fogging of the windshield, and the dehumidification capacity. However, without being limited to this, in the case of the air cooling mode, whether the cooling of the battery is permitted may be determined based on at least one of the open-closed state of the defroster blowing port, the air cooling load, the air cooling preference time from the vehicle start-up, the temperature of the internal air, the temperature of the inside heat exchanger, the likelihood of the fogging of the windshield, and the dehumidification capacity.

The disclosure can be used in the vehicle air conditioner including the heat pump system that is equipped in the vehicle, and a control device that controls the heat pump system.

What is claimed is:

1. A vehicle air conditioner comprising
a heat pump system that is equipped in a vehicle, and
an electronic control unit that controls the heat pump system, wherein:
an operation mode of the heat pump system includes an air cooling mode, an air heating mode and a battery cooling mode;
the heat pump system includes an outside heat exchanger, an inside heat exchanger, a compressor, an air-heating heat exchanger and a battery heat exchanger, the heat pump system being configured to cool a vehicle cabin using a vaporization heat of a refrigerant that is circulated by the compressor, in the air cooling mode, the vaporization heat being generated in the inside heat exchanger, the heat pump system being configured to heat the vehicle cabin using a condensation heat of the refrigerant that is circulated by the compressor, in the air heating mode, the condensation heat being generated in the air-heating heat exchanger, the heat pump system being configured to cool a battery using a vaporization heat of the refrigerant that is circulated by the compressor, in the battery cooling mode, the vaporization heat being generated in the battery heat exchanger; and
the electronic control unit is configured to separately set a first condition for permitting switching from the air cooling mode to the battery cooling mode and a second condition for permitting switching from the air heating mode to the battery cooling mode.

2. The vehicle air conditioner according to claim 1, wherein the electronic control unit is configured to determine whether to permit the switching from the air heating mode to the battery cooling mode, based on a battery cooling request level that is decided depending on a temperature of the battery.

3. The vehicle air conditioner according to claim 2, wherein the electronic control unit is configured to permit the switching from the air heating mode to the battery cooling mode, when the battery cooling request level is a level at which it is necessary to immediately cool the battery, in the air heating mode.

4. The vehicle air conditioner according to claim 1, wherein the electronic control unit is configured to determine whether to permit the switching from the air cooling mode to the battery cooling mode, based on at least one of an open-closed state of a defroster blowing port, an air cooling load, an air cooling preference time from a vehicle start-up, a temperature of air in the vehicle cabin, a temperature of the inside heat exchanger, and a dehumidification capacity.

5. The vehicle air conditioner according to claim 4, wherein:
the electronic control unit is configured to permit the switching from the air cooling mode to the battery cooling mode, when the defroster blowing port is in an open state and the dehumidification capacity is not insufficient in the air cooling mode; and
a determination of the sufficiency of the dehumidification capacity is based on a comparison to a threshold.

6. The vehicle air conditioner according to claim 4, wherein:
the electronic control unit is configured to permit the switching from the air cooling mode to the battery cooling mode, when the defroster blowing port is in a closed state, the air cooling load is low and the dehumidification capacity is not insufficient in the air cooling mode
a determination of the air cooling load is low when a target blowing temperature is equal to or more than a predetermined value to a threshold; and
a determination of the sufficiency of the dehumidification capacity is based on a comparison to a threshold.

7. The vehicle air conditioner according to claim 4, wherein the electronic control unit is configured to permit the switching from the air cooling mode to the battery cooling mode, when the defroster blowing port is in a closed state, the air cooling load is high where a target blowing temperature is less than a predetermined value and the air cooling preference time has elapsed in the air cooling mode.

8. The vehicle air conditioner according to claim 4, wherein:
the electronic control unit is configured to permit the switching from the air cooling mode to the battery cooling mode, when the defroster blowing port is in a closed state, the air cooling load is high where a target blowing temperature is less than a predetermined value, the air cooling preference time has not elapsed and the temperature of the air in the vehicle cabin is less than a preset value in the air cooling mode.

9. The vehicle air conditioner according to claim 4, wherein:
the electronic control unit is configured to permit the switching from the air cooling mode to the battery cooling mode, when the defroster blowing port is in a closed state, the air cooling load is high where a target blowing temperature is less than a predetermined value, the air cooling preference time has not elapsed, the temperature of the air in the vehicle cabin is is greater than a preset value and the temperature of the inside heat exchanger is less than a predetermined value in the air cooling mode.

10. The vehicle air conditioner according to claim 4, wherein the air cooling preference time is set to a preset time when a battery cooling request level that is decided depending on a temperature of the battery is is higher than a predetermined value, and is set to a shorter time than the preset time when the vehicle is traveling than when the vehicle is at a standstill.

11. The vehicle air conditioner according to claim 4, wherein:
the electronic control unit is configured to determine that the dehumidification capacity is not insufficient and the air cooling preference time has elapsed, when a battery cooling request level that is decided depending on a temperature of the battery is at a level higher than a preset value at which it is necessary to immediately cool the battery; and
a determination of the sufficiency of the dehumidification capacity is based on a comparison to a threshold.

12. The vehicle air conditioner according to claim 1, wherein:
the heat pump system includes a coolant circuit in which a coolant is circulated;
a heater core and the air-heating heat exchanger are provided in the coolant circuit; and
the heat pump system is configured such that the coolant is warmed in the air-heating heat exchanger and the vehicle cabin is heated by the heater core in the air heating mode.

* * * * *